(12) United States Patent
Yavuz et al.

(10) Patent No.: US 10,448,292 B2
(45) Date of Patent: Oct. 15, 2019

(54) DETERMINING HANDOVER PARAMETER FOR TRANSMISSION BY ACCESS POINT

(75) Inventors: Mehmet Yavuz, San Diego, CA (US); Farhad Meshkati, San Diego, CA (US); Yi Jiang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 116 days.

(21) Appl. No.: 12/909,026

(22) Filed: Oct. 21, 2010

(65) Prior Publication Data

US 2011/0263256 A1    Oct. 27, 2011

Related U.S. Application Data

(60) Provisional application No. 61/254,148, filed on Oct. 22, 2009.

(51) Int. Cl.
*H04W 36/00* (2009.01)
*H04W 48/04* (2009.01)
*H04W 88/08* (2009.01)

(52) U.S. Cl.
CPC ........ *H04W 36/0085* (2018.08); *H04W 48/04* (2013.01); *H04W 88/08* (2013.01)

(58) Field of Classification Search
CPC ............. H04W 36/00; H04W 36/0072; H04W 36/0077; H04W 36/0061; H04W 26/0044
USPC .................................................. 455/436–444
See application file for complete search history.

(56) References Cited

U.S. PATENT DOCUMENTS

| 5,722,072 | A  | * | 2/1998  | Crichton ............... H04W 36/04 455/437 |
| 8,639,251 | B2 | * | 1/2014  | Gunnarsson .......... H04W 36/04 455/436 |
| 2004/0114552 | A1 | * | 6/2004  | Lim et al. ..................... 370/324 |
| 2005/0286476 | A1 | * | 12/2005 | Crosswy et al. .............. 370/338 |

(Continued)

FOREIGN PATENT DOCUMENTS

| CN | 101184331 A | 5/2008 |
| CN | 101355812 A | 1/2009 |

(Continued)

OTHER PUBLICATIONS

International Search Report and Written Opinion—PCT/US2010/053869—ISA/EPO—dated Feb. 14, 2011.

(Continued)

*Primary Examiner* — William Lu
(74) *Attorney, Agent, or Firm* — Arent Fox, LLP

(57) ABSTRACT

A parameter for transmission by an access point is determined in a manner that facilitates access terminal mobility. For example, a cell reselection parameter and/or a handover parameter may be determined based on the quality of a signal from one access point (e.g., a macro cell) at another access point (e.g., a femto cell). In addition, a cell reselection parameter and/or a handover parameter may be determined based on the proximity of one access point (e.g., a femto cell) to another access point (e.g., a macro cell). Through the use of these techniques, a parameter may be determined in a manner that mitigates access terminal ping-ponging between access points and that mitigates outages that may otherwise occur as a result of an access terminal remaining on an access point too long.

37 Claims, 14 Drawing Sheets

(56) References Cited

U.S. PATENT DOCUMENTS

| | | | |
|---|---|---|---|
| 2007/0097938 A1* | 5/2007 | Nylander | H04L 61/1511 370/338 |
| 2008/0056150 A1 | 3/2008 | Kujala | |
| 2008/0101301 A1 | 5/2008 | Thomas et al. | |
| 2008/0153497 A1* | 6/2008 | Kalhan | H04W 88/10 455/436 |
| 2008/0227453 A1* | 9/2008 | Somasundaram et al. | 455/436 |
| 2008/0305801 A1* | 12/2008 | Burgess et al. | 455/444 |
| 2009/0046665 A1* | 2/2009 | Robson | H04W 36/04 370/332 |
| 2009/0131016 A1 | 5/2009 | Osborn | |
| 2009/0163212 A1* | 6/2009 | Hall | H04W 36/32 455/438 |
| 2009/0196253 A1* | 8/2009 | Semper | 370/331 |
| 2009/0270107 A1* | 10/2009 | Lee et al. | 455/450 |
| 2009/0291690 A1* | 11/2009 | Guvenc et al. | 455/444 |
| 2009/0298470 A1* | 12/2009 | Huber | H04W 12/08 455/411 |
| 2010/0029274 A1 | 2/2010 | Deshpande et al. | |
| 2010/0093358 A1* | 4/2010 | Cheong et al. | 455/444 |
| 2010/0112998 A1 | 5/2010 | Choudhury et al. | |
| 2010/0151870 A1 | 6/2010 | Piercy et al. | |
| 2010/0246544 A1* | 9/2010 | Brisebois | H04W 24/00 370/338 |
| 2010/0273487 A1* | 10/2010 | Alonso-Rubio et al. | 455/436 |
| 2010/0317386 A1 | 12/2010 | Da et al. | |
| 2011/0021240 A1* | 1/2011 | Hiltunen et al. | 455/522 |
| 2011/0111759 A1 | 5/2011 | Chami | |
| 2011/0183676 A1* | 7/2011 | Lee et al. | 455/438 |
| 2011/0263260 A1 | 10/2011 | Yavuz et al. | |

FOREIGN PATENT DOCUMENTS

| | | |
|---|---|---|
| CN | 101529948 A | 9/2009 |
| JP | 2009534984 A | 9/2009 |
| WO | WO0230135 | 4/2002 |
| WO | WO2008025874 A1 | 3/2008 |
| WO | WO2008054072 A1 | 5/2008 |
| WO | WO-2008084072 A2 | 7/2008 |
| WO | WO-2008098898 A2 | 8/2008 |
| WO | WO2009053710 | 4/2009 |

OTHER PUBLICATIONS

International Search Report and Written Opinion—PCT/US2010/053870—ISA/EPO—dated Feb. 14, 2011.

Qualcomm Europe: "Measurement and Mobility Issues for Home (E)Node BS" 3GPP RAN WG2 #59bis, R2-074117, Oct. 2, 2007.

* cited by examiner

```
┌─────────────────────────────────────────────────────────────────────┐
│ DETERMINE PROXIMITY OF A FEMTO CELL TO A MACRO CELL                 │
│                                                                     │
│    DETERMINE BASED ON MACRO SIGNAL AT THE FEMTO CELL                │
│    (E.G., MEASURE SIGNAL PARAMETER SUCH AS Ecp/Io OR RSCP; AND      │
│    DETERMINE PROXIMITY BASED THE MEASURED SIGNAL PARAMETER)         │
│    (E.G., ESTIMATE PATH LOSS BASED ON RSCP AND TRANSMIT POWER;      │
│    AND DETERMINE PROXIMITY BASED ON ESTIMATED PATH LOSS)            │
│                                                                     │
│    DETERMINE BASED ON SIGNAL INFORMATION RECEIVED FROM              │
│    ACCESS TERMINAL (E.G., RECEIVED IN RESPONSE TO A REQUEST)        │
│    (E.G., RECEIVE SIGNAL INFORMATION AND DETERMINE PROXIMITY        │
│    BASED ON THE SIGNAL INFORMATION)                                 │
│                                                                     │
│    DETERMINE BASED ON RECEIVED PROXIMITY INDICATION                 │
│    (E.G., RECEIVED FROM ACCESS TERMINAL OR VIA BACKHAUL)            │
│                               402                                   │
└─────────────────────────────────────────────────────────────────────┘
                                   │
                                   ▼
┌─────────────────────────────────────────────────────────────────────┐
│ DETERMINE A CELL RESELECTION PARAMETER (E.G., Qhyst, Qqualmin,      │
│ Treseleciton, OR Qrxlevmin) BASED ON THE PROXIMITY                  │
│                                                                     │
│    DETERMINE AS A FUNCTION OF THE PROXIMITY                         │
│    (E.G., CALCULATE CELL RESELECTION PARAMETER BASED ON             │
│    PROXIMITY)                                                       │
│                                                                     │
│    DETERMINE BASED ON WHETHER PROXIMITY IS INDICATIVE OF            │
│    FEMTO CELL BEING AT CELL SITE OR CELL EDGE                       │
│    (E.G., IF AT CELL SITE, SET CELL RESELECTION PARAMETER TO        │
│    REDUCE PREMATURE RESELECTIONS; IF AT CELL EDGE, SET CELL         │
│    RESELECTION PARAMETER TO REDUCE OUTAGES)                         │
│                                                                     │
│    DETERMINE BASED ON THRESHOLD                                     │
│    (E.G., COMPARE PROXIMITY PARAMETER TO THRESHOLD; SET CELL        │
│    RESELECTION PARAMETER TO CELL SITE VALUE IF PROXIMITY            │
│    PARAMETER ≥ THRESHOLD; SET CELL RESELECTION PARAMETER TO         │
│    CELL EDGE VALUE IF PROXIMITY PARAMETER ≤ THRESHOLD)              │
│                               404                                   │
└─────────────────────────────────────────────────────────────────────┘
                                   │
                                   ▼
┌─────────────────────────────────────────────────────────────────────┐
│             TRANSMIT THE CELL RESELECTION PARAMETER                 │
│                               406                                   │
└─────────────────────────────────────────────────────────────────────┘
```

FIG. 4

DETERMINING HANDOVER PARAMETER FOR TRANSMISSION BY ACCESS POINT

CLAIM OF PRIORITY

This application claims the benefit of and priority to commonly owned U.S. Provisional Patent Application No. 61/254,148, filed Oct. 22, 2009, the disclosure of which is hereby incorporated by reference herein.

CROSS-REFERENCE TO RELATED APPLICATION

This application is related to concurrently filed and commonly owned U.S. patent application Ser. No. 12/909,000, entitled "DETERMINING CELL RESELECTION PARAMETER FOR TRANSMISSION BY ACCESS POINT," and the disclosure of which is hereby incorporated by reference herein.

BACKGROUND

Field

This application relates generally to wireless communication and more specifically, but not exclusively, to determining a parameter to be transmitted by an access point.

Introduction

A wireless communication network may be deployed over a defined geographical area to provide various types of services (e.g., voice, data, multimedia services, etc.) to users within that geographical area. In a typical implementation, macro access points (e.g., each of which provides service via one or more cells) are distributed throughout a macro network to provide wireless connectivity for access terminals (e.g., cell phones) that are operating within the geographical area served by the macro network. A macro network deployment is carefully planned, designed and implemented to offer good coverage over the geographical region. Such a careful planning cannot, however, completely accommodate channel characteristics such as path loss, fading, multipath, shadowing, and so on, in indoor environments. Indoor users, therefore, often face coverage issues (e.g., call outages, quality degradation) resulting in poor user experiences.

To supplement conventional network access points (e.g., macro access points), small-coverage access points may be deployed (e.g., installed in a user's home) to provide more robust indoor wireless coverage or other coverage for access terminals. Such small-coverage access points may be referred to as, for example, femto access points, femto cells, home NodeBs, home eNodeBs, or access point base stations. Typically, such small-coverage access points are connected to the Internet and the mobile operator's network via a DSL router or a cable modem. For convenience, small-coverage access points may be referred to as femto cells or femto access points in the discussion that follows.

An unplanned deployment of large numbers of femto cells may present various operational issues. As one example, issues may arise for mobility management of an access terminal between a macro network and a femto cell. Here, as an access terminal roams throughout the geographical area associated with a network, signal conditions for the access terminal within a given cell may deteriorate, whereby the access terminal may be better served by another cell (e.g., access point) in the network. That is, it may be desirable for the access terminal to reselect to another cell in idle mode or be handed-over to another cell in active mode. A typical example would be where a mobile subscriber currently served by a macro cell comes to a location (e.g., the subscriber's home) where a femto cell for that subscriber is deployed, or where a mobile subscriber currently served by a femto cell leaves the coverage of the femto cell and needs to acquire service from the macro cell.

To facilitate such mobility, an access terminal regularly monitors for signals (e.g., beacon/pilot signals) of nearby cells. These signals are then compared to determine whether the access terminal should remain on its current serving cell or switch to another cell. In practice, one or more parameters may be used to control how aggressively (e.g., under what signal conditions) an access terminal performs searches for other cells. In addition, one or more parameters may be used to control when (e.g., under what signal conditions) an access terminal re-selects to another cell or is handed-over to another cell.

For example, macro system information block (SIB) settings such as SIB3 and SIB11 may be set to ensure good femto cell discovery performance and avoid unnecessary registration attempts by macro access terminals (e.g., access terminals that are not authorized for access at the femto cell). Once an access terminal is camped on a femto cell, the access terminal uses SIB settings broadcast by the femto cell for idle cell reselection. Hence, the femto cell SIB parameters (e.g., SIB3 and SIB11) also may be set to provide good performance for home access terminals (e.g., access terminals that are authorized for access at the femto cell). In particular, it may be desirable to set the SIB parameters of the femto cell such that a home access terminal reselects to a macro cell in a timely manner as the home access terminal leaves the femto cell coverage so that the access terminal does not go into outage. Moreover, it also may be desirable to avoid ping-ponging effects between the femto cell and the macro cell (e.g., an access terminal reselecting back and forth between the femto cell and the macro cell). Timely reselection to the macro cell and avoiding ping-pong effects between the femto cell and the macro cell may improve performance in terms of missed pages, call drops, and access terminal battery life.

For an access terminal that obeys search thresholds (e.g., Sintrasearch and Sintersearch), the search thresholds broadcast by a femto cell may be set relatively low such that the access terminal performs searches only when the signal quality on the femto cell is relatively low (e.g., when $E_{cp}/I_0 < -15$ dB). This may avoid possible ping-ponging between the femto cell and the macro cell, especially near the macro cell site where the macro $E_{cp}/I_0$ is relatively high. At the same time, the Qhyst parameter broadcast by the femto cell may be set to a low value (e.g., 2 dB) to ensure timely cell reselection from the femto cell to the macro cell, especially when the femto cell is located at the macro cell edge where macro $E_{cp}/I_0$ is relatively low.

However, some access terminals may perform searches irrespective of search thresholds. For these access terminals, the Sintrasearch and Sintersearch parameters may not be of use for avoiding the above ping-pong effect.

SUMMARY

A summary of several sample aspects of the disclosure follows. This summary is provided for the convenience of the reader and does not wholly define the breadth of the disclosure. For convenience, the term some aspects may be used herein to refer to a single aspect or multiple aspects of the disclosure.

The disclosure relates in some aspects to determining one or more parameters for transmission by an access point to facilitate access terminal mobility. For example, in some aspects, a parameter may be determined in a manner that mitigates ping-ponging between cells that may otherwise occur for an access terminal. In addition, in some aspects, a parameter may be determined in a manner that mitigates outages that may otherwise occur as a result of an access terminal remaining on an access point too long.

These parameters may take various forms. For example, in some aspects, these parameters may include idle mode cell reselection parameters such as a Qhyst parameter, a Qqualmin parameter, a Treselection parameter, a Qrxlevmin parameter, and a Qoffset parameter. In addition, in some aspects, these parameters may include active mode handover parameters such as a hysteresis (Hyst) parameter, a cell individual offset (CIO) parameter, and a time to trigger parameter.

These parameters may be determined based on various factors. For example, in some aspects, a cell reselection parameter and/or a handover parameter may be determined based on the quality of a signal from one access point (e.g., a macro cell) at another access point (e.g., a femto cell). In addition, in some aspects, a cell reselection parameter and/or a handover parameter may be determined based on the proximity of one access point (e.g., a femto cell) to another access point (e.g., a macro cell).

BRIEF DESCRIPTION OF THE DRAWINGS

These and other sample aspects of the disclosure will be described in the detailed description and the appended claims that follow, and in the accompanying drawings, wherein:

FIG. 4 is a flowchart of several sample aspects of operations that may be performed to transmit a cell reselection parameter based on determined proximity;

Figure 1:
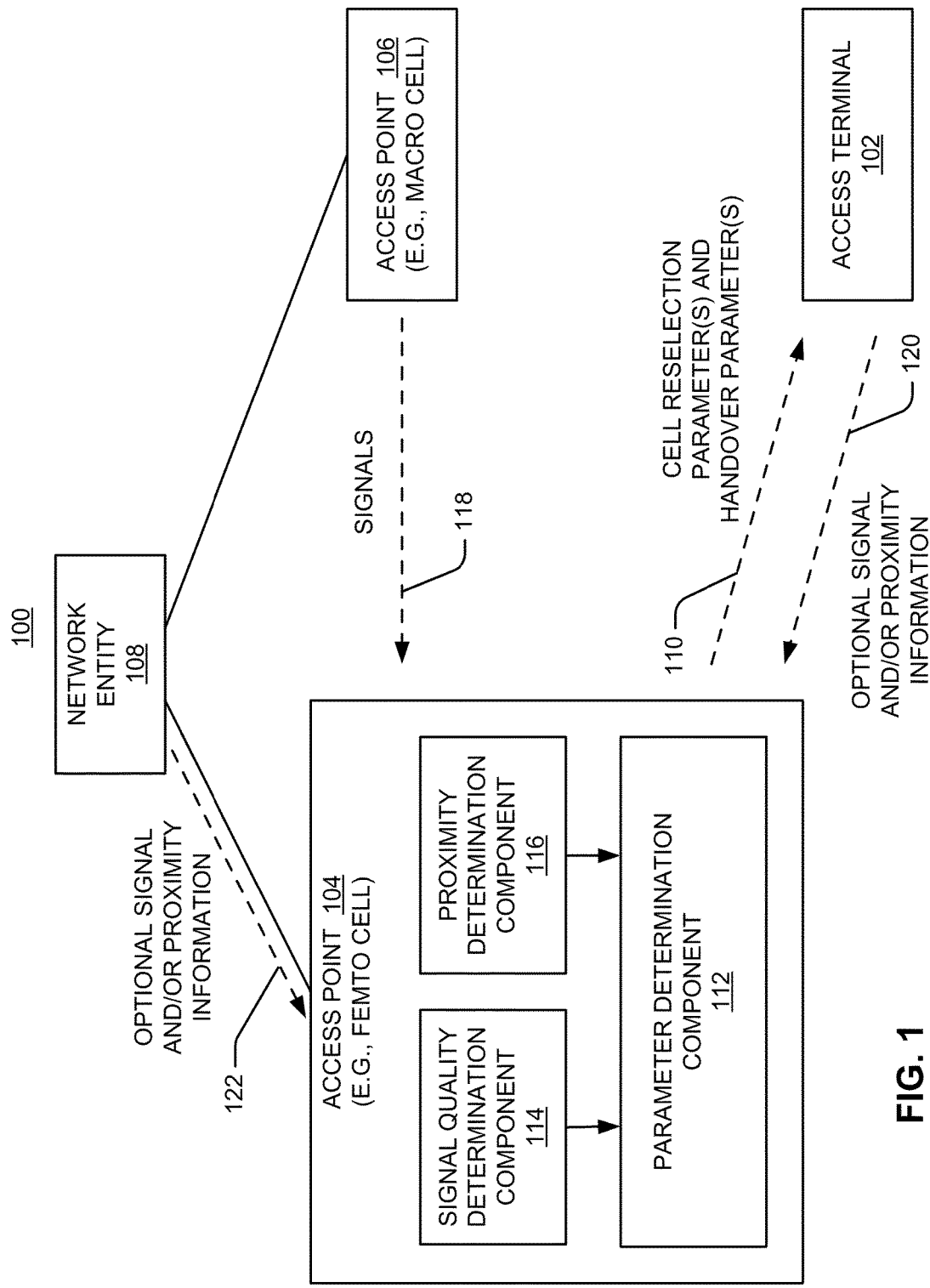
FIG. 1 is a simplified block diagram of several sample aspects of a communication system where an access point transmits a mobility parameter based on determined signal quality and/or proximity.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, femto cells, macro cells, and so on, while access terminals may be referred to or implemented as user equipment (UEs), mobile stations, and so on.

Access points in the system 100 provide access to one or more services (e.g., network connectivity) for one or more wireless terminals (e.g., access terminal 102) that may be installed within or that may roam throughout a coverage area of the system 100. For example, at various points in time the access terminal 102 may connect to an access point 104, an access point 106, or some access point in the system 100 (not shown). Each of these access points may communicate with one or more network entities (represented, for convenience, by a network entity 108) to facilitate wide area network connectivity.

These network entities may take various forms such as, for example, one or more radio and/or core network entities. Thus, in various implementations the network entities may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals. Also, two of more of these network entities may be co-located and/or two or more of these network entities may be distributed throughout a network.

Access points in the system 100 transmit cell reselection parameters and handover parameters to control various aspects of how access terminals perform idle mode cell reselection operations and active mode handover operations, respectively. In the example of FIG. 1, the access point 104 (e.g., a femto cell) transmits cell reselection parameters and handovers parameters as represented by the dashed line 110. Access terminals (e.g., the access terminal 102) in the vicinity of the access point 104 may thus receive these parameters and use them for controlling various mobility operations (e.g., determining whether to reselect to another cell, determining whether to perform a handover-related operation, determining whether to conduct inter-frequency searches).

In accordance with the teachings herein, an access point may dynamically (i.e., with respect to the location of the access point) specify the value of such a parameter to provide improved cell reselection performance and/or handover performance. In particular, an access point may employ different parameter settings based on the location of the access point to improve the performance (e.g., in terms of fewer missed pages, fewer call drops, and longer battery life) of an access terminal that uses these parameters. For example, a parameter may be set to one value if a first access point (e.g. a femto cell) is located at a cell site of a second access point (e.g. a macro cell) or the parameter may be set to a different value if the access point is located at a cell edge of the second access point.

If the first access point is at the cell site, the parameter is set to reduce the likelihood that an access terminal currently camping on or being served by the first access point will prematurely reselect to the second access point. For example, the parameter may be set to bias any reselection or handover decision toward remaining on the first access point. Thus, this parameter setting mitigates ping-ponging between cells that may otherwise occur for that access terminal due to the presence of relatively strong signals from both access points in this case.

If the first access point is at the cell edge, the parameter may be set to reduce the likelihood that an access terminal that is experiencing diminishing service from the first access point (e.g., due to the access terminal moving away from the first access point) will remain on the first access point instead of reselecting to the second access point. For example, the parameter may be set to bias any reselection or handover decision toward not remaining on the first access point if signal quality at the first access point is diminishing. Thus, this parameter setting mitigates outages that may otherwise occur as a result of the access terminal remaining on the first access point for too long under these conditions.

In view of the above, the first access point may determine (e.g., select, adjust, calculate, or receive) the values to be used for the cell reselection parameters and/or the handovers parameters by determining the proximity of the first access point to a cell site or a cell edge of the second access point. In this way, depending on whether the first access point is located at the cell site or the cell edge of the second access point, the first access point may automatically transmit appropriate parameters to facilitate efficient reselection and/or handover of a nearby access terminal that receives these parameters.

As a specific example, a Qhyst parameter for a femto cell may be set to a relatively low value if the femto cell is located at a cell edge of a macro cell, while the Qhyst parameter for the femto cell may be set to a higher value if the femto cell is located at the macro cell site. This may ensure that at the cell edge where macro signal quality is low, an access terminal reselects from the femto cell to the macro cell in a timely manner as the access terminal leaves the femto cell. Here, if the Qhyst parameter was set too high at the cell edge, the macro cell may not rank higher than the femto cell and, hence, the access terminal may stay on the femto cell even when the access terminal is relatively far away from the femto cell. In such a case, the access terminal may eventually go to outage. On the other hand, at the cell site, the Qhyst parameter for the femto cell is set to a higher value to avoid a situation where the access terminal ping-pongs between the femto cell and the macro cell. Here, if the Qhyst parameter for the femto cell is set too low, the macro cell may rank higher than the femto cell at the femto cell boundary and, as a result, the access terminal may prematurely reselect from the femto cell to the macro cell. In this case, when the access terminal goes to the macro cell, if the femto cell quality is good enough, the access terminal may immediately (or relatively quickly) reselect back to the femto cell.

In some aspects, a determination as to whether the first access point is located at a cell site or cell edge of the second access point may involve determining the relative proximity of the access points and/or determining the quality of a signal transmitted by the second access point as that signal appears at the first access point. For example, in FIG. 1, the access point 104 may determine cell reselection and handover parameters based on a determination of the proximity of the access point 104 to the access point 106. In addition, the access point 104 may determine cell reselection and handover parameters based on a determination of the quality of a signal from the access point 106 at the access point 104.

Accordingly, the access point 104 includes a parameter determination component 112 that determines cell reselection parameters and/or handover parameters based on signal quality information provided by a signal quality determination component 114 or based on proximity information provided by a proximity determination component 116. The components 114 and 116 determine their respective information based on one or more of: signals received at the access point 104 from the access point 106 (as represented by the line 118), signal and/or proximity information received from the access terminal 102 (as represented by the line 120), or signal and/or proximity information received via the network backhaul (as represented by the line 122).

Figure 2:
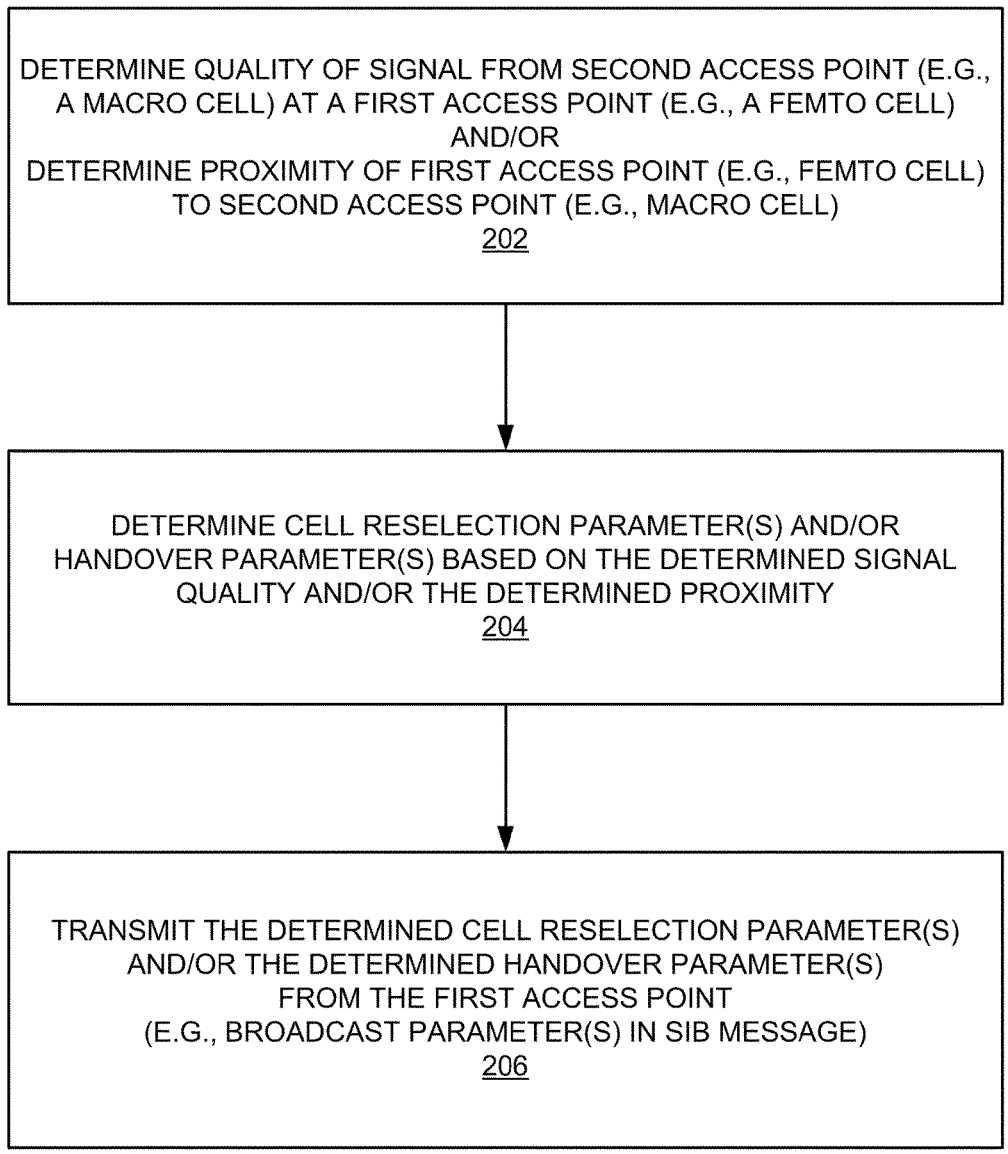
FIG. 2 is a flowchart of several sample aspects of operations that may be performed to transmit a mobility parameter based on determined signal quality and/or proximity.

FIG. 2 describes sample operations that may be employed at an access point to provide one or more cell reselection parameters and/or one or more handover parameters in accordance with the teachings herein. In this example, a first access point (e.g., a femto cell) determines the parameter value(s) it will transmit by determining the signal quality of a signal transmitted by a second access point (e.g., a macro cell) and/or by determining the proximity of the first access point to the second access point.

As represented by block 202 of FIG. 2, the first access point determines signal quality information and/or proximity information that will subsequently be used to determine a parameter to be transmitted by the first access point.

The first access point may determine the signal quality information in various ways. For example, the first access point may measure, estimate, or receive an estimate of a quality attribute of a signal at the first access point. This signal quality attribute may take various forms such as, for example, pilot strength ($E_{cp}/I_0$) or received signal code power (RSCP).

In some cases, the first access point measures a quality attribute of a signal transmitted by the second access point. For example, if the first access point includes network listen mode capabilities (e.g., a forward link receiver and corresponding decoding capabilities), the first access point may measure $E_{cp}/I_0$, RSCP, or some other attribute of a signal received from the second access point. In addition, in some cases, the first access point may generate signal quality information based on received signals (e.g., estimate the path loss between the access points as discussed herein).

In some cases, the first access point receives signal quality information from a nearby access terminal. For example, an access terminal currently camping on or being served by the first access point may measure a quality attribute of a received signal that was transmitted by the second access point. Since the access terminal is in close proximity to the first access point, this signal quality information provides an estimate of the signal quality at the first access point. The access terminal may then report this signal quality information (e.g., an indication of the signal quality) to the first access point. As a specific example, a femto cell may send a request to each of its access terminals (e.g., a home UE that is camped on or being served by the femto cell) to measure macro signals. Each access terminal that receives a request may then send a measurement report to the femto cell to provide information regarding the RF conditions seen by that access terminal.

In some cases, the first access point receives signal quality information via the backhaul. For example, an access terminal in close proximity to the first access point but currently camping on or being served by an access point other than the first access point (e.g., the second access point or some other access point) may measure a quality attribute of a received signal that was transmitted by the second access point. The access terminal may then report this signal quality information to its serving access point which, in turn, may report this information (e.g., an indication of the signal quality) to the first access point via the backhaul. Again, due to the close proximity of the access terminal to the first access point, this signal quality information provides an estimate of the signal quality at the first access point.

Turning now to the proximity information referenced at block 202, this proximity information may take various forms. For example, proximity information may take the form of an estimate of the distance between the access points (e.g., as indicated by an estimate of the path loss from the second access point to the first access point), an indication of whether the first access point is at a cell site or a cell edge of the second access point, or some other indication of the location of the first access point or the distance between the first and second access points.

The first access point may determine this proximity information in various ways. For example, the first access point may process signals received from the second access point to generate proximity information or the first access point may receive proximity information from another node.

The first access point may generate proximity information based on a signal received from the second access point in various ways. For example, the first access point may determine (e.g., estimate) the path loss from the second access point to the first access point based on signals received by the first access point. As one example, the first access point may measure received signal power (e.g., common pilot channel (CPICH) RSCP) of a signal from the second access point and also determine the transmit power used by the second access point to transmit that signal (e.g., by decoding the CPICH transmit power value broadcast by the second access point). The first access point may then estimate the path loss based on this received signal power and transmit power information. This path loss value, in turn, provides an indication of the proximity of the first access point to the second access point. Here, a low path loss value may indicate that the first access point is near a cell site of the second access point, while a high path loss value may indicate that the first access point is near a cell edge of the second access point.

The first access point may receive proximity information in various ways. For example, a network entity may send an explicit indication of the proximity to the first access point via the backhaul. Here, the network entity may indicate the distance between the access points, indicate whether the first access point is near a cell site or cell edge of the second access point (e.g., based on information maintained in a database), or provide some other suitable proximity indication. As another example, a network entity may send information (e.g., forward information from an access terminal in the vicinity of the first access point) that the first access point may then use to determine the proximity.

The first access point also may receive proximity information from an access terminal. For example, the first access point may send a request to an access terminal currently camping on or being served by the first access point to measure a signal from the second access point and send a report back to the first access point. This report may thus include, for example, information indicative of the proximity of the access terminal to the second access point. In addition, in some cases, this report may include information regarding the received signal quality of a signal from the first access point as seen by the access terminal. The first access point may then use this information to estimate proximity information (e.g., path loss). As a specific example, when a home UE arrives at a home femto cell and reselects to that femto cell, the femto cell may request that the home UE measure the CPICH RSCP of a macro cell. The femto cell may then use the reported value to estimate the path loss from the macro cell to the femto cell. Since the access terminal is in close proximity to the first access point, this path loss value provides an estimate of the path loss from the second access point to the first access point.

As another example, an access terminal in the vicinity of the first access point may directly calculate the path loss from the second access point to the access terminal (e.g., in a similar manner as discussed above), and send this information to the first access point (e.g., directly or via another access point). Again, this path loss information provides an estimate of the path loss from the second access point to the first access point.

As represented by block 204 of FIG. 2, the first access point determines one or more cell reselection parameters and/or one or more handover parameters based on the determined signal quality and/or the determined proximity of block 202. In particular, the first access point may derive one value for a parameter if the first access point is located near the second access point, or derive a different value for that parameter if the first access point is located near a cell edge of the second access point. The first access point may determine a parameter value in various ways.

In some cases, a parameter value is calculated as a function of the determined signal quality and/or the determined proximity. For example, a determined $E_{cp}/I_0$ value may be used as an input for an algorithm (e.g., equation) whereby the output of the algorithm provides the value to be used for a cell reselection parameter.

In some cases, a parameter value is selected from a set of defined values (e.g., a set of allowable values). For example, one value from the set may be defined for use in the event the first access point is at (e.g., near) a cell site of the second access point, while another value from the set may be defined for use in the event the first access point is at (e.g., near) a cell edge of the second access point. In some implementations, a determination of whether the first access point is near a cell site or cell edge involves determining whether the first access point is within a defined distance of the cell site or cell edge. This defined distance may be indicated, for example, by a path loss value or signal power level. In other implementations, a determination of whether the first access point is near a cell site involves determining whether the first access point is closer to the cell site than to the cell edge. Similarly, a determination of whether the first access point is near a cell edge may involve determining whether the first access point is closer to the cell edge than to the cell site.

In some cases, a parameter value is selected based on comparison of the determined signal quality or proximity value with one or more thresholds. For example, if a determined path loss value is less than or equal to a path loss threshold (thereby indicating that the first access point is relatively close to the cell site), a parameter may be set to a cell site-specific value. As a specific example, a path loss estimate of less than 110 dB may indicate that the first access point is at the cell site. Conversely, if a determined path loss value is greater than or equal to a path loss threshold (thereby indicating that the first access point is relatively close to the cell edge), the parameter may be set to a cell edge-specific value. As a specific example, a path loss estimate of greater than 125 dB may indicate that the first access point is at the cell edge.

As mentioned above, a parameter may be selected from a set of defined parameter values. For example, one parameter value may be defined for the case where the first access point is near a cell site, another parameter value may be defined for the case where the first access point is near a cell edge, and yet another parameter value may be defined for the case where the first access point is between a cell site and a cell edge. Other types of parameter values may be used in other cases.

As represented by block 206 of FIG. 2, the first access point transmits the parameter(s) determined at block 204 at appropriate times. For example, the first access point may transmit a broadcast channel including cell reselection parameters in one or more SIBs, whereby any access terminals camping on or being served by that access point may use these parameters to control how the access terminal reselects from one cell to another cell (e.g., from one access point to another). Similarly, the first access point may transmit a broadcast channel including handover parameters in one or more SIBs, whereby any access terminals camping on or being served by that access point may use these parameters to control how the access terminal is handed-over from one cell to another cell (e.g., from one access point to another).

Sample operations for determining parameters in accordance with the teachings herein will now be described in more detail in conjunction with the flowcharts of FIGS. 3-7.

Figure 6:
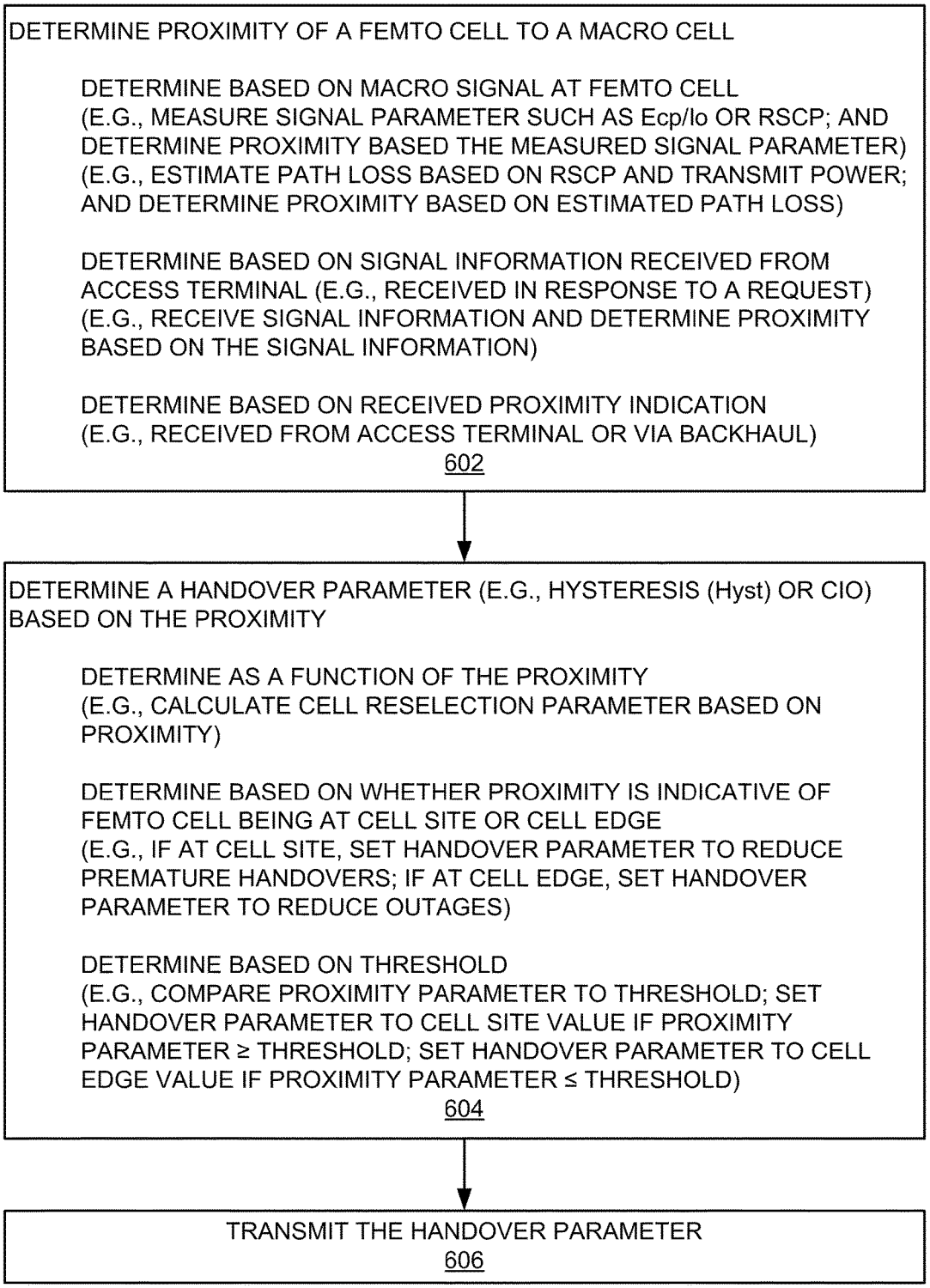
FIG. 6 is a flowchart of several sample aspects of operations that may be performed to transmit a handover parameter based on determined proximity.
Figure 7:
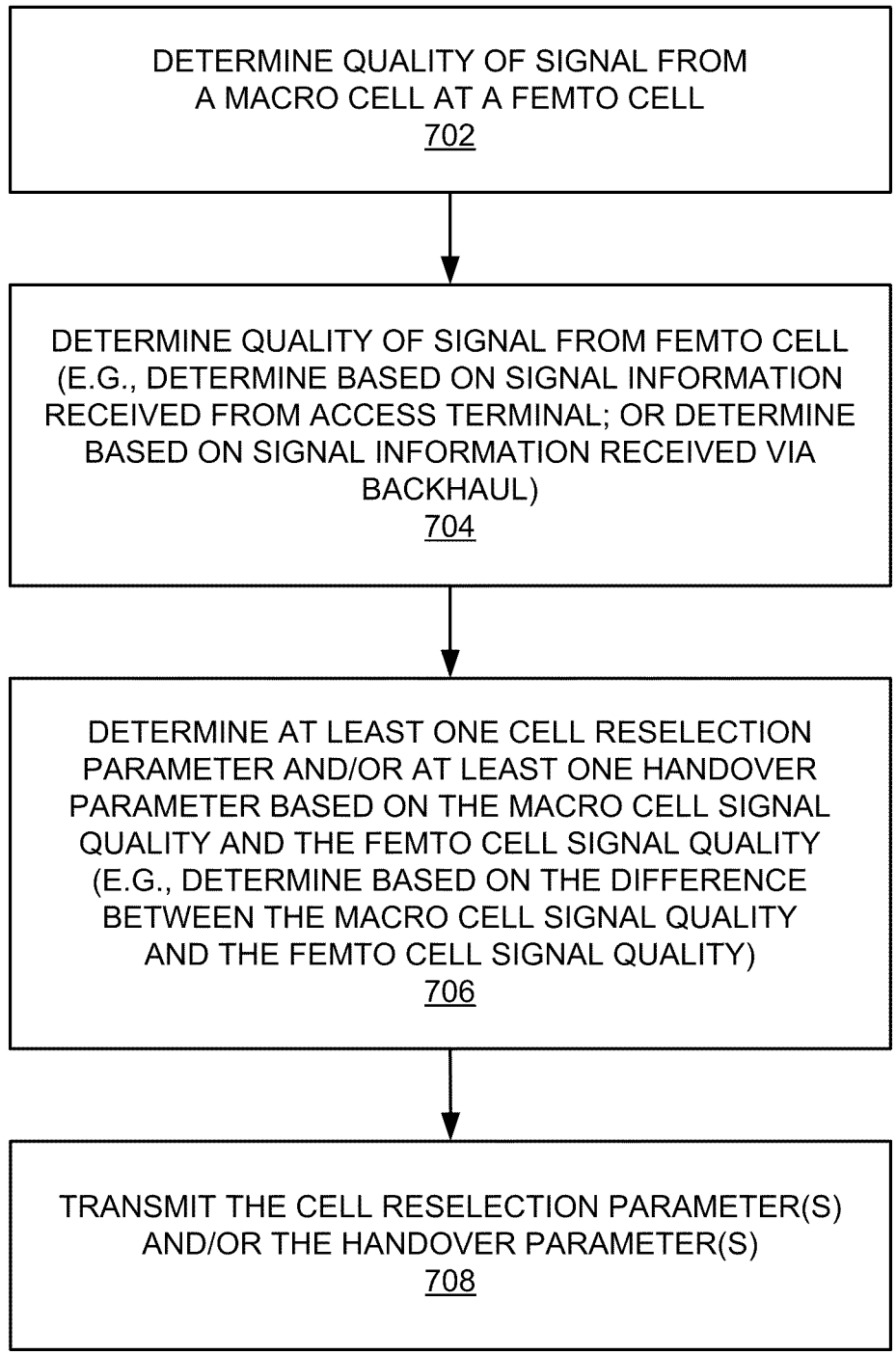
FIG. 7 is a flowchart of several sample aspects of operations that may be performed to transmit a cell reselection parameter and/or a handover parameter based on determined signal quality for multiple access points.
Figure 8:
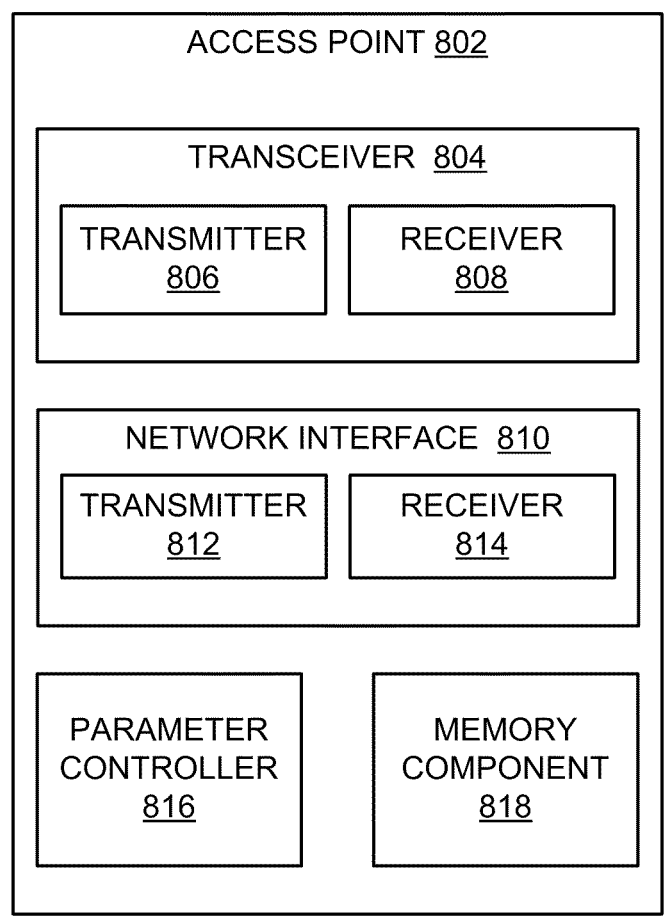
FIG. 8 is a simplified block diagram of several sample aspects of components that may be employed in communication nodes.

For convenience, the operations of FIGS. 3-7 (or any other operations discussed or taught herein) may be described as being performed by specific components (e.g., the components of FIG. 1 and FIG. 8). It should be appreciated, however, that these operations may be performed by other types of components and may be performed using a different number of components. It also should be appreciated that one or more of the operations described herein may not be employed in a given implementation.

Figure 3:
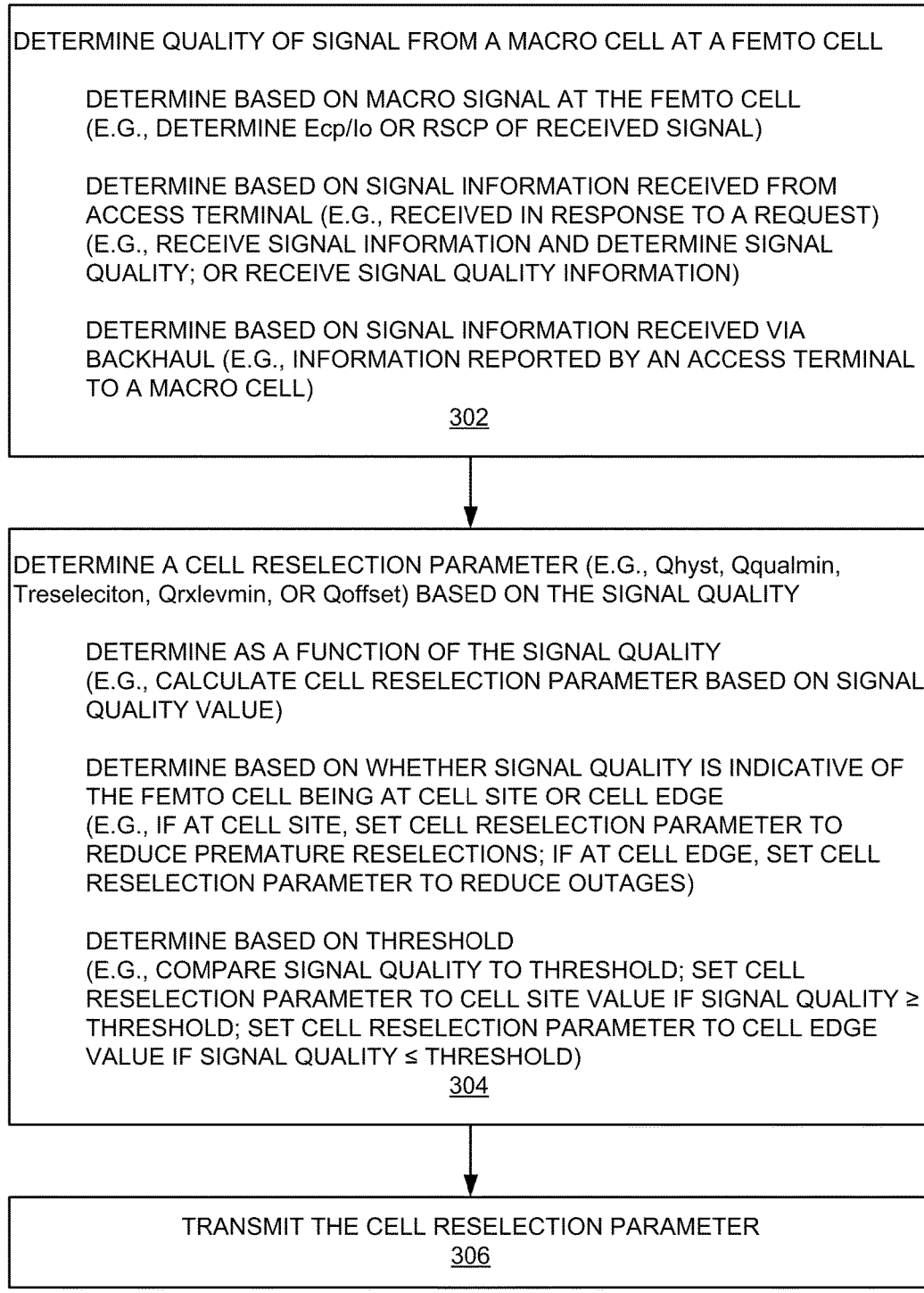
FIG. 3 is a flowchart of several sample aspects of operations that may be performed to transmit a cell reselection parameter based on determined signal quality.

FIG. 3 describes sample operations that may be performed to determine a cell reselection parameter based on signal quality information. For purposes of illustration, this example is described in the context of a femto cell that determines a cell reselection parameter value by determining the signal quality of a signal transmitted by a macro cell. It should be appreciated that the described techniques may be applicable to other types of access points.

As represented by block 302, the quality of a signal from a macro signal at the femto cell is determined. As mentioned above, this signal quality may be determined in various ways.

As one example, the femto cell may determine signal quality based on a macro signal that is received at the femto cell (e.g., through the use of a network listen mode). For example, the femto cell may measure $E_{cp}/I_0$, RSCP, or some other attribute of a signal transmitted by the macro cell.

As another example, the femto cell may determine signal quality based on signal information received from an access terminal. For example, an access terminal camping on or being served by the femto cell may measure $E_{cp}/I_0$, RSCP, or some other attribute of a signal transmitted by the macro cell. The access terminal may then report this information to the femto cell. In some cases, the access terminal may conduct this measurement in response to a request from the femto cell. In some cases, the femto cell may directly receive signal quality information (e.g., $E_{cp}/I_0$, RSCP, etc.) from the access terminal. In some cases, the femto cell may receive signal information (e.g., instantaneous power values) from the access terminal and then determine signal quality information (e.g., an average power value) based on the received information.

As yet another example, the femto cell may determine signal quality based on signal information received from an access terminal that is in close proximity to the femto cell but that is camping on or being served by some other cell. For example, such an access terminal may measure $E_{cp}/I_0$, RSCP, or some other attribute of a signal transmitted by the macro cell, and then report this information to the serving cell for that access terminal. The serving cell may then send this information to the femto cell via the backhaul.

As represented by block 304, the first access point determines a cell reselection parameter based on the determined signal quality. As mentioned above, this cell reselection parameter may be determined in various ways.

In some cases, the cell reselection parameter is determined as a function of the determined signal quality. An example of such a function for an $E_{cp}/I_0$ signal quality and a Qhyst parameter is as follows:

$$Qhyst = \left\lfloor \frac{2}{3}\left(\frac{E_{cp,macro}}{I_0} + 18\right)\right\rfloor dB$$

Here, Qhyst is set to 0 dB if the $E_{cp}/I_0$ of the macro signal at the femto cell is −18 dB. Similarly, Qhyst is set to 4 dB if the $E_{cp}/I_0$ of the macro signal at the femto cell is −12 dB.

In this case, cell reselection may occur when the $E_{cp}/I_0$ of the femto signal at an access terminal served by the femto cell is less than −16 dB. As another example, Qhyst is set to 8 dB if the $E_{cp}/I_0$ of the macro signal at the femto cell is −6 dB. In this case, cell reselection may occur when the $E_{cp}/I_0$ of the femto signal at an access terminal served by the femto cell is less than −14 dB. As yet another example, Qhyst is set to 10 dB if the $E_{cp}/I_0$ of the macro signal at the femto cell is −3 dB. In this case, cell reselection may occur when the $E_{cp}/I_0$ of the femto signal at an access terminal served by the femto cell is less than −13 dB.

In some cases, the cell reselection parameter is determined based on whether the signal quality is indicative of the femto cell being at the cell site or the cell edge of the macro cell. For example, if the signal quality indicates that the femto cell is at the cell site, the cell reselection parameter may be set to a value that mitigates premature reselection by an access terminal camping on or being served by the femto cell as discussed above. Conversely, if the signal quality indicates that the femto cell is at the cell edge, the cell reselection parameter may be set to a value that mitigates outages at an access terminal camping on or being served by the femto cell as discussed above.

In some cases, the cell reselection parameter is determined through the use of a threshold. For example, if the signal quality (e.g., $E_{cp}/I_0$ or RSCP) is greater than or equal to a threshold, the cell reselection parameter may be set to a value that is specified for a cell site. Conversely, if the signal quality is less than or equal to a threshold (e.g., the same threshold or a different threshold), the cell reselection parameter may be set to a value that is specified for a cell edge.

As mentioned above, various types of cell reselection parameters may be determined through the use of the teachings herein. Several examples of how such parameters may be defined for cell site and cell edge scenarios follow.

In some aspects, a Qhyst parameter specifies a hysteresis value that is used at an access terminal to bias a cell reselection decision. In general, a higher Qhyst value will tend to bias a cell reselection decision toward remaining with the serving cell. Conversely, a lower Qhyst value will tend to bias a cell reselection decision toward leaving the serving cell. Thus, a Qhyst parameter may be set to a higher value if the femto cell is at the cell site to mitigate premature cell reselection as discussed herein, and may be set to a lower value if the femto cell is at a cell edge to mitigate outages as discussed herein.

In some aspects, a Qqualmin parameter may correspond to a minimum required signal quality at a cell (e.g., the serving cell or a target cell). A lower Qqualmin value for a target cell (or a higher value for a serving cell) may increase the likelihood that an access terminal will reselect to the target cell. Conversely, a higher Qqualmin value for a target cell (or a lower value for a serving cell) may decrease the likelihood that an access terminal will reselect to the target cell. Thus, a Qqualmin parameter specified for the target cell (e.g., the macro cell) may be set to a higher value if the femto cell is at the cell site, and set to a lower value if the femto cell is at a cell edge.

In some aspects, a Qoffset parameter may correspond to an offset that is added to a measurement (e.g., signal strength) of a cell. A higher Qoffset value for a target cell (e.g., the macro cell) may increase the likelihood that an access terminal will reselect to the target cell. Conversely, a lower Qoffset value for a target cell may decrease the likelihood that an access terminal will reselect to the target cell. Thus, a Qoffset parameter for the target cell may be set to a lower value if the femto cell is at the cell site, and set to a higher value if the femto cell is at a cell edge.

In some aspects, a Treselection parameter may correspond to the amount of time an access terminal waits before performing cell reselection. A higher (i.e., longer) Treselection value may decrease the likelihood that an access terminal will reselect to the target cell. Conversely, a lower (i.e., shorter) Treselection value for a target cell may decrease the likelihood that an access terminal will reselect to the target cell. Thus, a Treselection parameter may be set to a higher value if the femto cell is at the cell site, and set to a lower value if the femto cell is at a cell edge.

In some aspects, a Qrxlevmin parameter may correspond to minimum received signal level for a cell (e.g., a measure of a cell's quality based on RSCP). A higher Qrxlevmin value for a target cell (or a lower value for a serving cell) may decrease the likelihood that an access terminal will reselect to the target cell. Conversely, a lower Qrxlevmin value for a target cell (or a higher value for a serving cell) may increase the likelihood that an access terminal will reselect to the target cell. Thus, a Qrxlevmin parameter for the target cell (e.g., the macro cell) may be set to a higher value if the femto cell is at the cell site, and set to a lower value if the femto cell is at a cell edge.

Also, the cell reselection parameter being used may depend on the signal quality being measured. For example, if the reselection criterion is based on CPICH RSCP, Qhyst1 and Qoffset1 cell reselection parameters may be used. Conversely, if the reselection criterion is based on CPICH $E_{cp}/I_0$, Qhyst2 and Qoffset2 cell reselection parameters may be used.

As represented by block 306 of FIG. 3, the femto cell transmits the cell reselection parameter determined at block 304. Consequently, upon reception of this parameter, any access terminals camping on or being served by the femto cell may use the cell reselection parameter to control its cell reselection operations.

FIG. 4 describes sample operations that may be performed to determine a cell reselection parameter based on proximity information. For purposes of illustration, this example is described in the context of a femto cell that determines a cell reselection parameter value based on the relative proximity of the femto cell to a macro cell.

As represented by block 402, the proximity of the femto cell to a macro cell is determined. As mentioned above, this proximity may be determined in various ways.

As one example, the femto cell may determine proximity information based on a macro signal that is received at the femto cell (e.g., through the use of a network listen mode). For example, the femto cell may determine the path loss between the femto cell and the macro cell based on signals (e.g., received power and an indication of transmit power) received by the femto cell as discussed herein. This path loss value may then provide (or may be used to provide) an indication of the proximity of the femto cell to the macro cell.

As another example, the femto cell may determine proximity information based on signal information that the femto cell receives from an access terminal. In some implementations, an access terminal camping on or being served by the femto cell may measure received signal power (e.g., $E_{cp}/I_0$ or RSCP) of a signal from the macro cell and report this information to the femto cell. The femto cell may then use this information to estimate the path loss between the femto cell and the macro cell. In other implementations, the access terminal may estimate the path loss between the access terminal and the macro cell (e.g., as discussed herein)

and report this information to the femto cell as an estimate of the path loss between the femto cell and the macro cell. In some implementations, the access terminal provides the information to the femto cell in response to a request from the femto cell for the information. In some implementations, an access terminal in close proximity to the femto cell may conduct the measurements described above and report the corresponding information to its serving access point, whereupon the serving access point forwards this information to the femto cell via the backhaul.

As yet another example, the femto cell may receive an explicit indication of the proximity of the femto cell to the macro cell. For example, a network entity or access terminal may provide information to the femto cell that indicates the distance from the femto cell to the macro cell, indicates whether the femto cell is at a cell site or a cell edge, or indicates the location of the femto cell in some other manner.

As represented by block 404 of FIG. 4, the femto cell determines a cell reselection parameter based on the determined proximity. This cell reselection parameter may be determined in various ways as discussed herein.

In some cases, the cell reselection parameter is determined as a function of the determined proximity. For example, a cell reselection parameter may be calculated as a function of the estimated path loss.

In some cases, the cell reselection parameter is determined based on whether the proximity is indicative of the femto cell being at the cell site or the cell edge of the macro cell. As discussed herein, if a proximity parameter (e.g., path loss) indicates that the femto cell is at the cell site, the cell reselection parameter may be set to a value that mitigates premature reselection by an access terminal camping on or being served by the femto cell. Conversely, if the proximity parameter indicates that the femto cell is at the cell edge, the cell reselection parameter may be set to a value that mitigates outages at an access terminal camping on or being served by the femto cell as discussed above.

In some cases, the cell reselection parameter is determined through the use of a threshold. For example, if a proximity parameter (e.g., path loss) is greater than or equal to a threshold, the cell reselection parameter may be set to a value that is specified for a cell site. Conversely, if the proximity parameter is less than or equal to a threshold (e.g., the same threshold or a different threshold), the cell reselection parameter may be set to a value that is specified for a cell edge.

Cell reselection parameters similar to those discussed at block 304 (i.e., Qhyst, Qqualmin, Treselection, and Qrxlevmin) may be employed in an implementation that determines cell reselection parameters based on proximity information. In addition, these parameters may be adjusted in a similar manner as discussed above. For example, a Qhyst parameter may be set to a higher value if the femto cell is at the cell site to mitigate premature cell reselection as discussed herein, and may be set to a lower value if the femto cell is at a cell edge to mitigate outages as discussed herein, and so on.

As represented by block 406 of FIG. 4, the femto cell transmits the cell reselection parameter determined at block 404. Consequently, any access terminals camping on or being served by the femto cell may use the cell reselection parameter to control its cell reselection operations.

Figure 5:
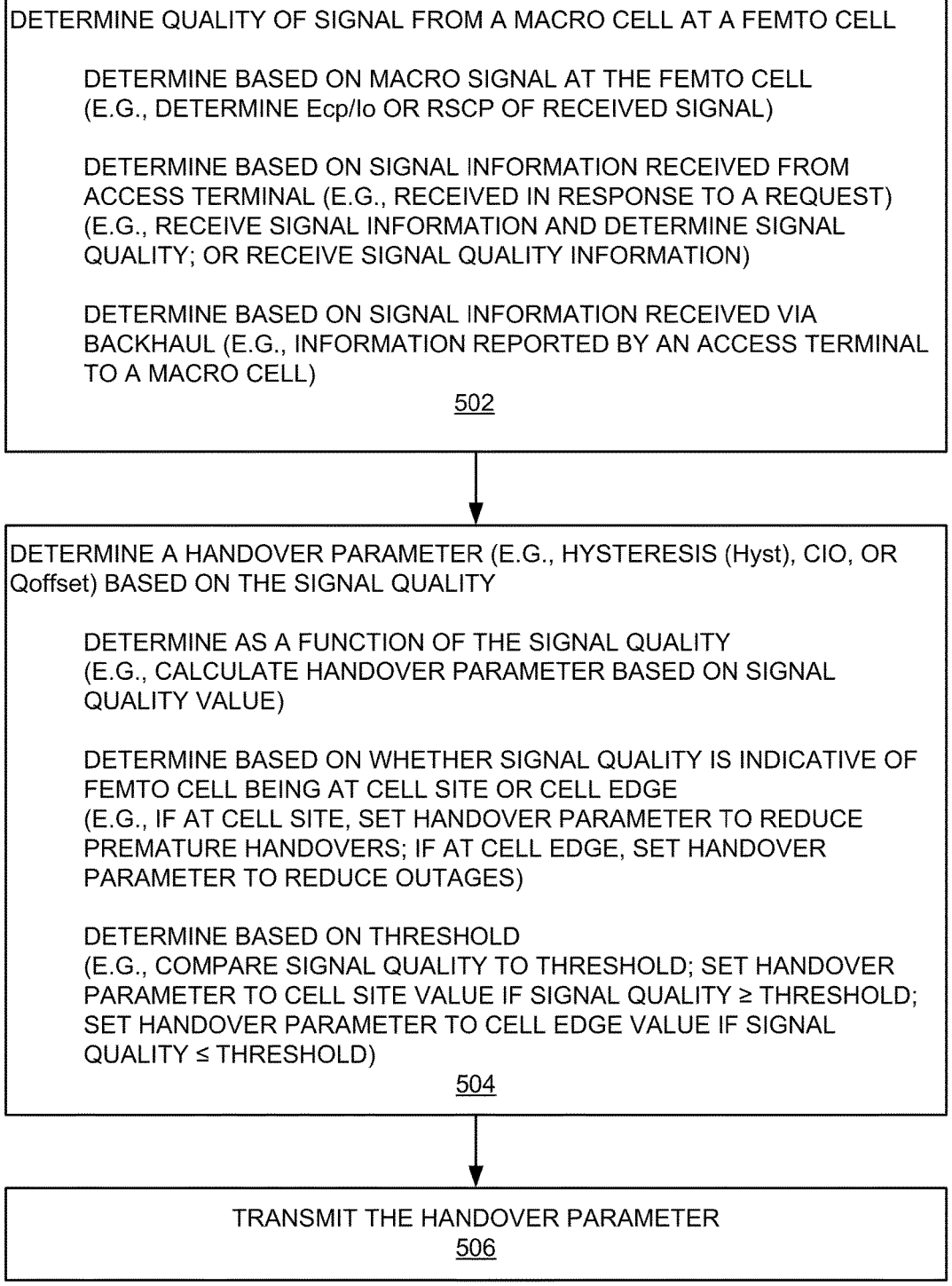
FIG. 5 is a flowchart of several sample aspects of operations that may be performed to transmit a handover parameter based on determined signal quality.

FIG. 5 describes sample operations that may be performed to determine a handover parameter based on signal quality information. For purposes of illustration, this example is described in the context of a femto cell that determines a handover parameter value by determining the signal quality of a signal transmitted by a macro cell.

As represented by block 502, the quality of a signal from a macro cell at the femto cell is determined. This signal quality may be determined, for example, in a similar manner as discussed above at block 302 (e.g., by measuring $E_{cp}/I_0$ or RSCP of a signal from the macro cell).

As represented by block 504, the first access point determines a handover parameter based on the determined signal quality. This handover parameter may be determined in various ways as discussed herein.

In some cases, the handover parameter is determined as a function of the determined signal quality. For example, a handover parameter may be calculated as a function of the $E_{cp}/I_0$ or RSCP of the macro cell signal.

In some cases, the handover parameter is determined based on whether the determined signal quality is indicative of the femto cell being at the cell site or the cell edge of the macro cell. If the signal quality indicates that the femto cell is at the cell site, the handover parameter may be set to a value that mitigates premature handover of an access terminal being served by the femto cell to the macro cell. Conversely, if the signal quality indicates that the femto cell is at the cell edge, the handover parameter may be set to a value that mitigates outages at an access terminal being served by the femto cell that may result from the access terminal not being handed-over to the macro cell.

In some cases, the handover parameter is determined through the use of a threshold. For example, if the signal quality (e.g., $E_{cp}/I_0$ or RSCP) is greater than or equal to a threshold, the handover parameter may be set to a value that is specified for a cell site. Conversely, if the signal quality is less than or equal to a threshold (e.g., the same threshold or a different threshold), the handover parameter may be set to a value that is specified for a cell edge.

As mentioned above, various types of handover parameters may be determined through the use of the teachings herein. Several examples of how such parameters may be defined for cell site and cell edge scenarios follow.

In some aspects, a hysteresis parameter (e.g. Hyst) for active mode specifies a hysteresis value that is used to bias a handover decision. For example, a higher hysteresis value may tend to bias a handover triggering event (e.g., Event 1a) toward the serving cell. Conversely, a lower hysteresis value may tend to bias a handover triggering event toward the target cell. Thus, an active mode hysteresis parameter may be set to a higher value if the femto cell is at the cell site to mitigate premature cell handover as discussed herein, and may be set to a lower value if the femto cell is at a cell edge to mitigate outages as discussed herein.

In some aspects, a time to trigger parameter may correspond to the period of time an event triggering condition must be satisfied before transmission of a measurement message can occur. A higher (i.e., longer) time to trigger value may decrease the likelihood that an access terminal will be handed-over to the target cell. Conversely, a lower (i.e., shorter) time to trigger value may increase the likelihood that the access terminal will be handed-over to the target cell. Thus, a time to trigger parameter may be set to a higher value if the femto cell is at the cell site, and set to a lower value if the femto cell is at a cell edge.

In some aspects, a cell individual offset (CIO) parameter for active mode specifies a bias towards a target cell. For example, a lower CIO value may tend to bias a handover decision in active mode toward remaining on the serving cell. Conversely, a higher CIO value may tend to bias a handover decision in active mode toward handing-over to the target cell. Thus, a CIO parameter may be set to a lower value if the femto cell is at the cell site to mitigate premature cell reselection as discussed herein, and may be set to a higher value if the femto cell is at a cell edge to mitigate outages as discussed herein.

As represented by block 506, the femto cell transmits the handover parameter determined at block 504. Consequently, upon receiving this parameter, any access terminals being served by the femto cell may use the handover parameter (or the access terminal may forward the parameter to the network) to control the access terminal's handover operations.

FIG. 6 describes sample operations that may be performed to determine a handover parameter based on proximity information. For purposes of illustration, this example is described in the context of a femto cell that determines a handover parameter value based on the relative proximity of the femto cell to a macro cell.

As represented by block 602, the proximity of the femto cell to a macro cell is determined. This proximity information may be determined, for example, in a similar manner as discussed above at block 402 (e.g., by estimating the path loss between the femto cell and the macro cell).

As represented by block 604, the femto cell determines a handover parameter based on the determined proximity. This handover parameter may be determined in various ways as discussed herein.

In some cases, the handover parameter is determined as a function of the determined proximity. For example, a handover parameter may be calculated as a function of the estimated path loss.

In some cases, the handover parameter is determined based on whether the proximity is indicative of the femto cell being at the cell site or the cell edge of the macro cell. As discussed herein, if a proximity parameter (e.g., path loss) indicates that the femto cell is at the cell site, the handover parameter may be set to a value that mitigates premature handover by an access terminal being served by the femto cell. Conversely, if the proximity parameter indicates that the femto cell is at the cell edge, the handover parameter may be set to a value that mitigates outages at an access terminal being served by the femto cell as discussed above.

In some cases, the handover parameter is determined through the use of a threshold. For example, if a proximity parameter (e.g., path loss) is greater than or equal to a threshold, the handover parameter may be set to a value that is specified for a cell site. Conversely, if the proximity parameter is less than or equal to a threshold (e.g., the same threshold or a different threshold), the handover parameter may be set to a value that is specified for a cell edge.

Handover parameters similar to those discussed at block 504 (i.e., hysteresis and CIO) may be employed in an implementation that determines handover parameters based on proximity information. In addition, these parameters may be adjusted in a similar manner as discussed above. For example, an active mode hysteresis parameter may be set to a higher value if the femto cell is at the cell site to mitigate premature cell reselection as discussed herein, and may be set to a lower value if the femto cell is at a cell edge to mitigate outages as discussed herein, and so on.

As represented by block 606, the femto cell transmits the handover parameter determined at block 604. Consequently, any access terminals being served by the femto cell may use (or forward) the handover parameter to control the access terminal's handover operations.

FIG. 7 describes sample operations that may be performed to determine a cell reselection parameter or a handover parameter based on signal quality information associated with signals from multiple access points. Again, for purposes of illustration, this example describes a case where a femto cell determines (e.g., selects or fine-tunes) a parameter based on femto access terminal (e.g., home UE) measurement reports of femto cell signal quality and macro cell signal quality.

As represented by block 702, the quality of a signal from a macro cell at the access terminal is determined. This signal quality may be determined, for example, by the access terminal in a similar manner as discussed above at block 302 (e.g., by measuring $E_{cp}/I_0$ or RSCP of a signal received from the macro cell).

As represented by block 704, the quality of a signal from the femto cell is determined. This signal quality may be determined, for example, via access terminal measurements as discussed above. For example, an access terminal currently camping on or being served by the femto cell may measure signals received from the femto cell (e.g., to obtain $E_{cp}/I_0$ or RSCP information) and report this information to the femto cell. In some implementations, the access terminal provides this information to the femto cell in response to a request from the femto cell for the information. In some implementations, an access terminal in close proximity to the femto cell may conduct the measurements described above and report the corresponding information to its serving access point, whereupon the serving access point forwards this information to the femto cell via the backhaul.

As represented by block 706, the femto cell determines at least one cell reselection parameter and/or at least one handover parameter based on the quality of the signal from the macro cell and the quality of the signal from the femto cell. For example, the value of a parameter may be derived based on the difference between these quality values.

For purposes of illustration, an example where a Qhyst parameter is selected based on femto cell signal quality and macro cell signal quality follows. Here, based on the joint distribution of the femto cell $E_{cp}/I_0$ and the macro cell $E_{cp}/I_0$, Qhyst may be chosen as the lowest possible value such that ping-ponging between the macro cell and the femto cell is avoided. Thus, if the difference between the femto cell signal quality and macro cell signal quality is relatively large, Qhyst is set to a lower value. Conversely, if the difference between the femto cell signal quality and macro cell signal quality is relatively small, Qhyst is set to a higher value.

As represented by block 708 of FIG. 7, the femto cell then transmits the parameter(s) determined at block 706. Consequently, any access terminals camping on or being served by the femto cell may use the parameter(s) to control its cell reselection and/or handover operations.

FIG. 8 illustrates several sample components (represented by corresponding blocks) that may be incorporated into nodes such as an access point 802 (e.g., corresponding to the access point 104) to perform parameter determination operations as taught herein. The described components also may be incorporated into other nodes in a communication system. For example, other nodes in a system may include components similar to those described for the access point 802 to provide similar functionality. Also, a given node may contain one or more of the described components. For example, an access point may contain multiple transceiver components that enable the access point to operate on multiple carriers and/or communicate via different technologies.

As shown in FIG. 8, the access point 802 includes a transceiver 804 for communicating with other nodes. The transceiver 804 includes a transmitter 806 for sending signals (e.g., parameters, requests, messages, indications) and a receiver 808 for receiving signals (e.g., parameter information, messages, indications).

The access point 804 also includes a network interface 810 for communicating with other nodes (e.g., network entities). For example, the network interface 810 may be configured to communicate with one or more network entities via a wire-based or wireless backhaul. In some aspects, the network interface 810 may be implemented as a transceiver (e.g., comprising a transmitter 812 and a receiver 814) configured to support wire-based or wireless communication.

The access point 802 also includes other components that may be used in conjunction with parameter determination operations as taught herein. For example, the access point 802 includes a parameter controller 816 for performing parameter-related operations (e.g., determining a quality of a signal, determining a cell reselection parameter, determining a proximity of a first access point to a second access point, determining a handover parameter) and for providing other related functionality as taught herein. In addition, the access point 802 includes a memory component 818 (e.g., including a memory device) for maintaining information (e.g., parameter-related information).

For convenience the access point 802 is shown in FIG. 8 as including components that may be used in the various examples described herein. In practice, one or more of the illustrated components may be implemented in different ways in different implementations. As an example, the functionality of the parameter controller 816 may be different in an embodiment implemented in accordance with FIG. 3 as compared to an embodiment implemented in accordance with FIG. 6.

In some implementations the components of FIG. 8 may be implemented in one or more processors (e.g., each of which uses and/or incorporates data memory for storing information or code used by the processor to provide this functionality). For example, some of the functionality represented by blocks 804 and 810 and some or all of the functionality represented by blocks 816 and 818 may be implemented by a processor or processors of an access point and data memory of the access point (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 9:
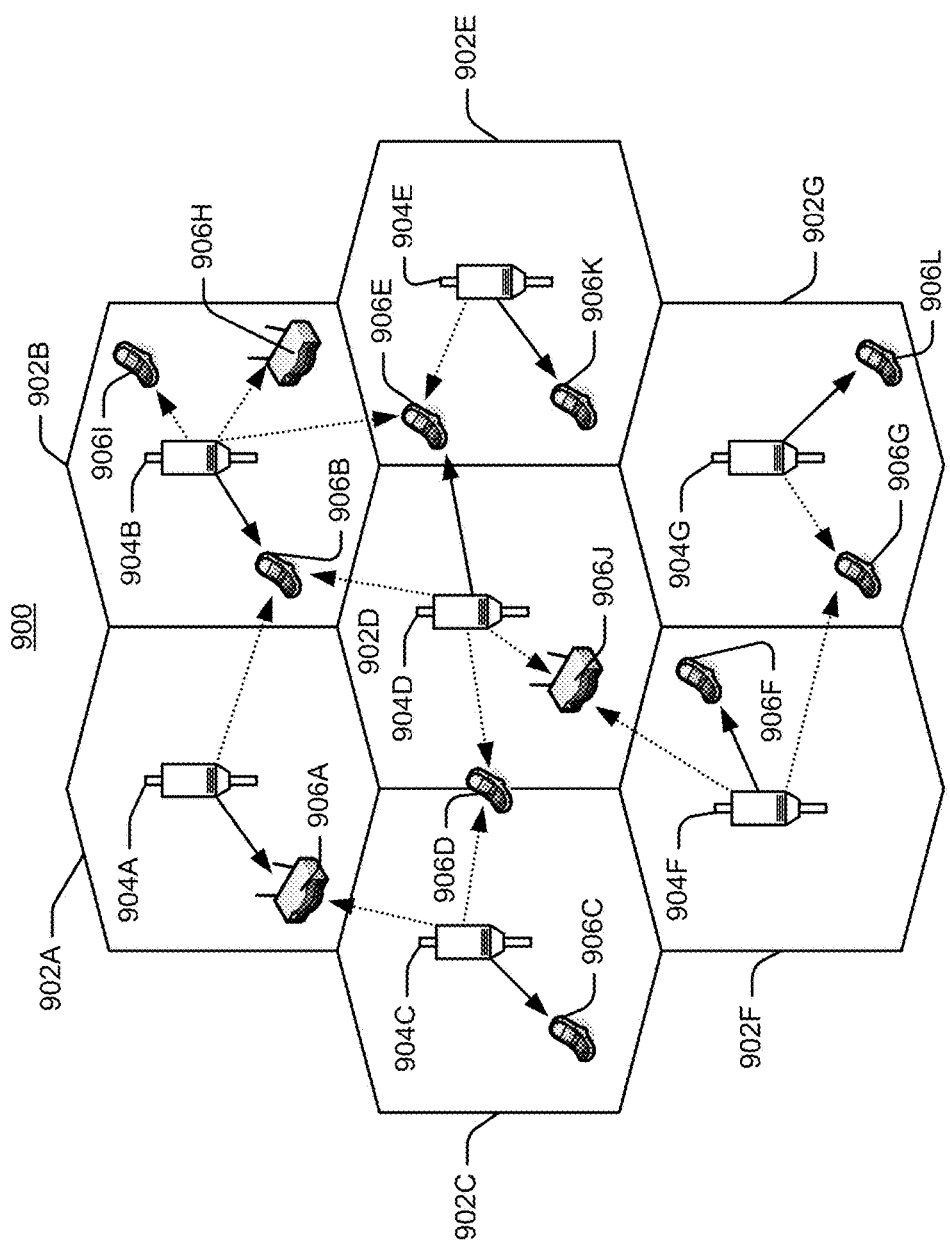
FIG. 9 is a simplified diagram of a wireless communication system.

FIG. 9 illustrates a wireless communication system 900, configured to support a number of users, in which the teachings herein may be implemented. The system 900 provides communication for multiple cells 902, such as, for example, macro cells 902A-902G, with each cell being serviced by a corresponding access point 904 (e.g., access points 904A-904G). As shown in FIG. 9, access terminals 906 (e.g., access terminals 906A-906L) may be dispersed at various locations throughout the system over time. Each access terminal 906 may communicate with one or more access points 904 on a forward link (FL) and/or a reverse link (RL) at a given moment, depending upon whether the access terminal 906 is active and whether it is in soft handoff, for example. The wireless communication system 900 may provide service over a large geographic region. For example, macro cells 902A-902G may cover a few blocks in a neighborhood or several miles in a rural environment.

Figure 10:
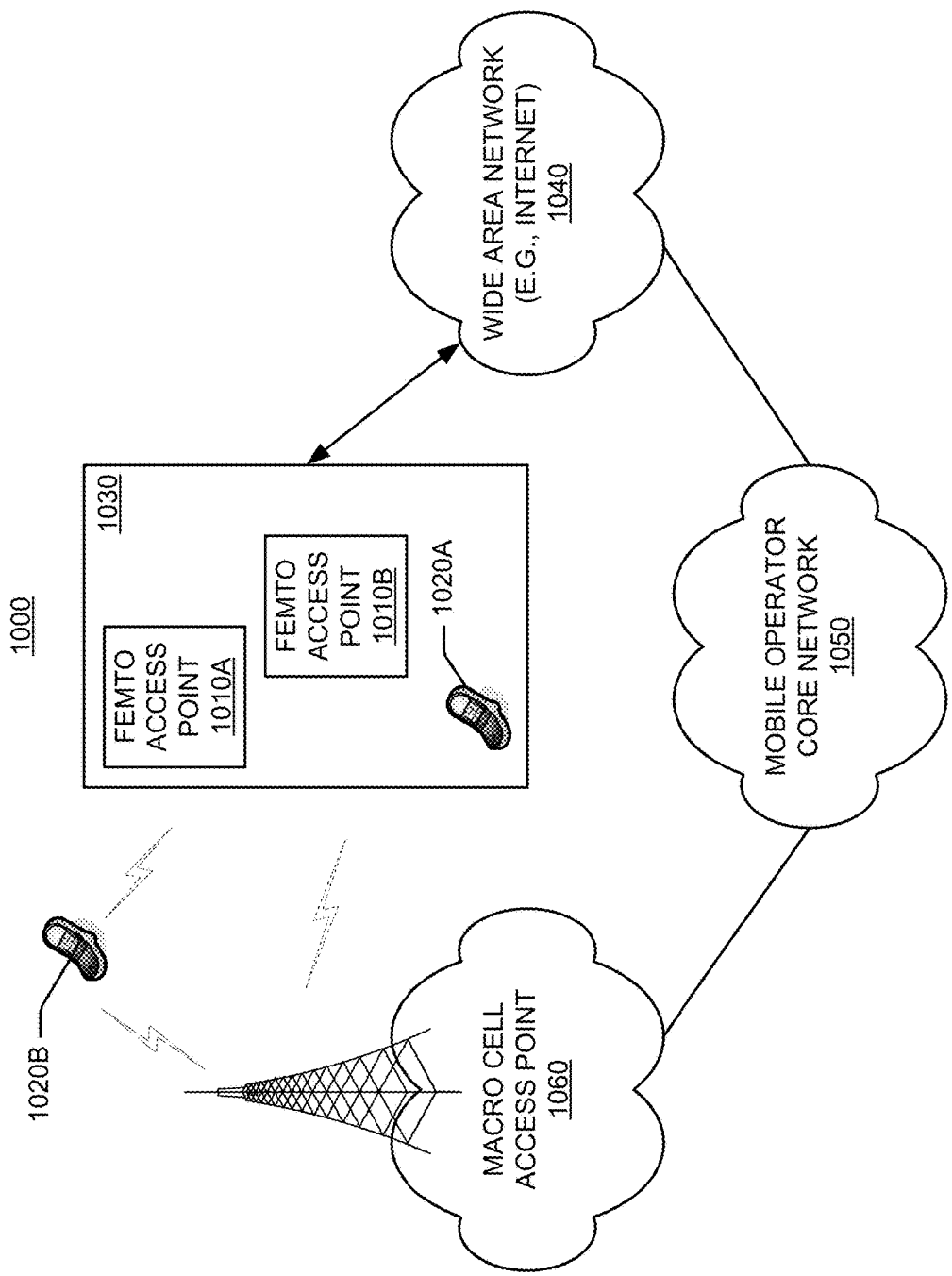
FIG. 10 is a simplified diagram of a wireless communication system including femto nodes.

FIG. 10 illustrates an exemplary communication system 1000 where one or more femto access points are deployed within a network environment. Specifically, the system 1000 includes multiple femto access points 1010 (e.g., femto access points 1010A and 1010B) installed in a relatively small scale network environment (e.g., in one or more user residences 1030). Each femto access point 1010 may be coupled to a wide area network 1040 (e.g., the Internet) and a mobile operator core network 1050 via a DSL router, a cable modem, a wireless link, or other connectivity means (not shown). As will be discussed below, each femto access point 1010 may be configured to serve associated access terminals 1020 (e.g., access terminal 1020A) and, optionally, other (e.g., hybrid or alien) access terminals 1020 (e.g., access terminal 1020B). In other words, access to femto access points 1010 may be restricted whereby a given access terminal 1020 may be served by a set of designated (e.g., home) femto access point(s) 1010 but may not be served by any non-designated femto access points 1010 (e.g., a neighbor's femto access point 1010).

Figure 11:
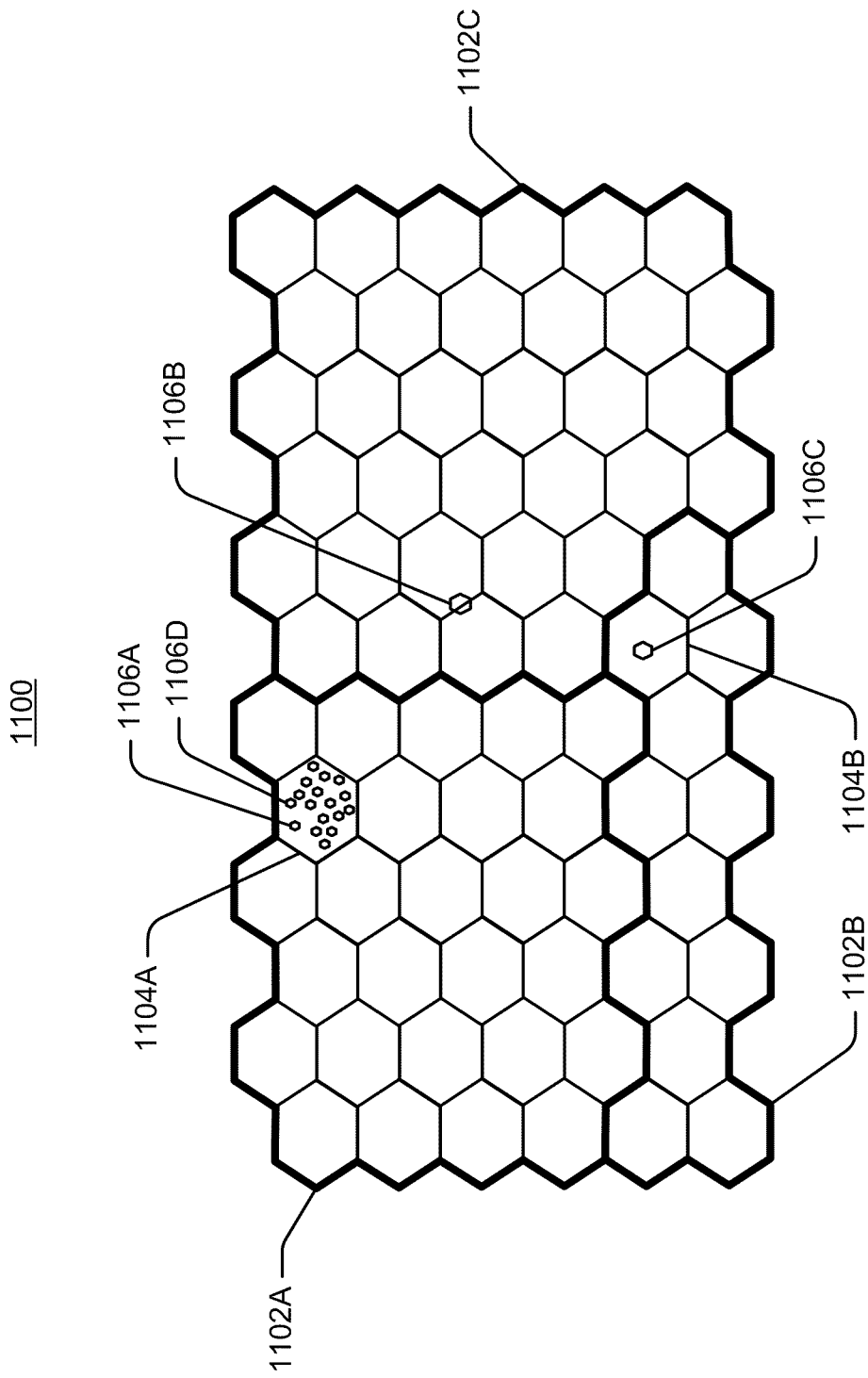
FIG. 11 is a simplified diagram illustrating coverage areas for wireless communication.

FIG. 11 illustrates an example of a coverage map 1100 where several tracking areas 1102 (or routing areas or location areas) are defined, each of which includes several macro coverage areas 1104. Here, areas of coverage associated with tracking areas 1102A, 1102B, and 1102C are delineated by the wide lines and the macro coverage areas 1104 are represented by the larger hexagons. The tracking areas 1102 also include femto coverage areas 1106. In this example, each of the femto coverage areas 1106 (e.g., femto coverage areas 1106B and 1106C) is depicted within one or more macro coverage areas 1104 (e.g., macro coverage areas 1104A and 1104B). It should be appreciated, however, that some or all of a femto coverage area 1106 may not lie within a macro coverage area 1104. In practice, a large number of femto coverage areas 1106 (e.g., femto coverage areas 1106A and 1106D) may be defined within a given tracking area 1102 or macro coverage area 1104. Also, one or more pico coverage areas (not shown) may be defined within a given tracking area 1102 or macro coverage area 1104.

Referring again to FIG. 10, the owner of a femto access point 1010 may subscribe to mobile service, such as, for example, 3G mobile service, offered through the mobile operator core network 1050. In addition, an access terminal 1020 may be capable of operating both in macro environments and in smaller scale (e.g., residential) network environments. In other words, depending on the current location of the access terminal 1020, the access terminal 1020 may be served by a macro cell access point 1060 associated with the mobile operator core network 1050 or by any one of a set of femto access points 1010 (e.g., the femto access points 1010A and 1010B that reside within a corresponding user residence 1030). For example, when a subscriber is outside his home, he is served by a standard macro access point (e.g., access point 1060) and when the subscriber is at home, he is served by a femto access point (e.g., access point 1010A). Here, a femto access point 1010 may be backward compatible with legacy access terminals 1020.

A femto access point 1010 may be deployed on a single frequency or, in the alternative, on multiple frequencies. Depending on the particular configuration, the single frequency or one or more of the multiple frequencies may overlap with one or more frequencies used by a macro access point (e.g., access point 1060).

In some aspects, an access terminal 1020 may be configured to connect to a preferred femto access point (e.g., the home femto access point of the access terminal 1020) whenever such connectivity is possible. For example, whenever the access terminal 1020A is within the user's residence 1030, it may be desired that the access terminal 1020A communicate only with the home femto access point 1010A or 1010B.

In some aspects, if the access terminal 1020 operates within the macro cellular network 1050 but is not residing on its most preferred network (e.g., as defined in a preferred roaming list), the access terminal 1020 may continue to search for the most preferred network (e.g., the preferred femto access point 1010) using a better system reselection (BSR) procedure, which may involve a periodic scanning of available systems to determine whether better systems are currently available and subsequently acquire such preferred systems. The access terminal 1020 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 1010, the access terminal 1020 selects the femto access point 1010 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 1010 that reside within the corresponding user residence 1030). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 12:
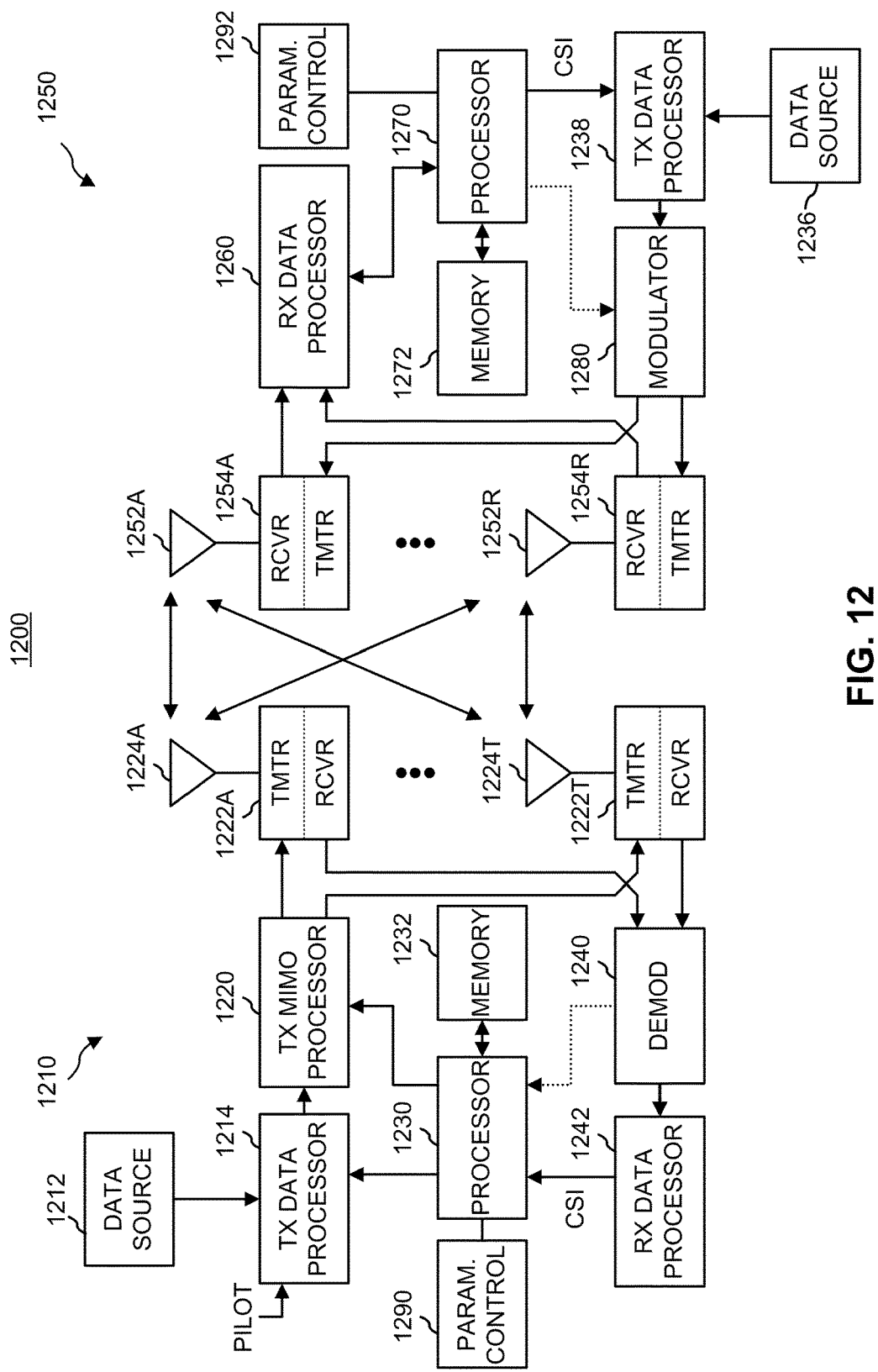
FIG. 12 is a simplified block diagram of several sample aspects of communication components.
Figure 13:
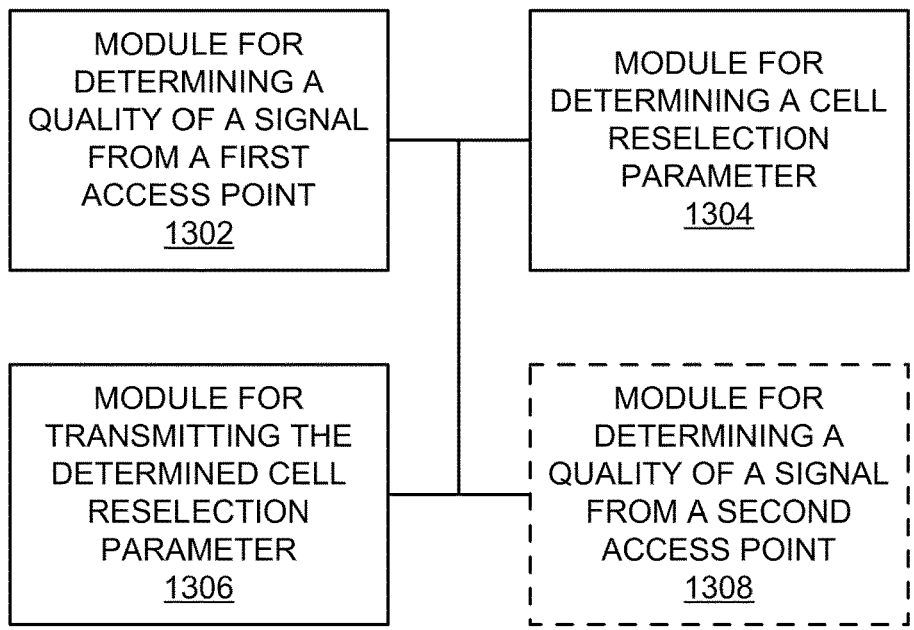
FIGS. 13-16 are simplified block diagrams of several sample aspects of apparatuses configured to transmit a mobility parameter based on determined signal quality and/or proximity as taught herein.
Figure 14:
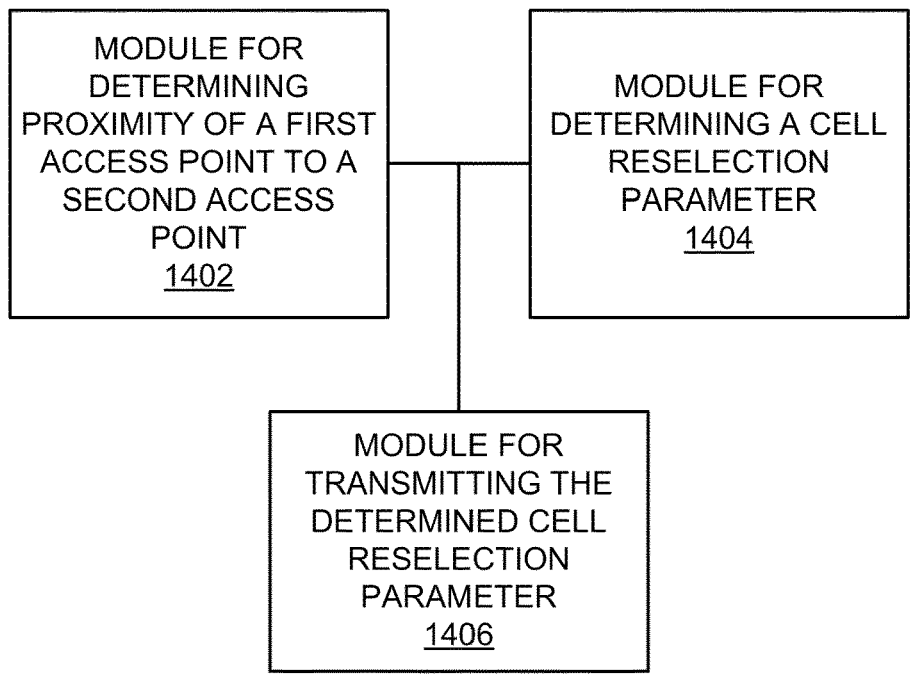
Figure 15:
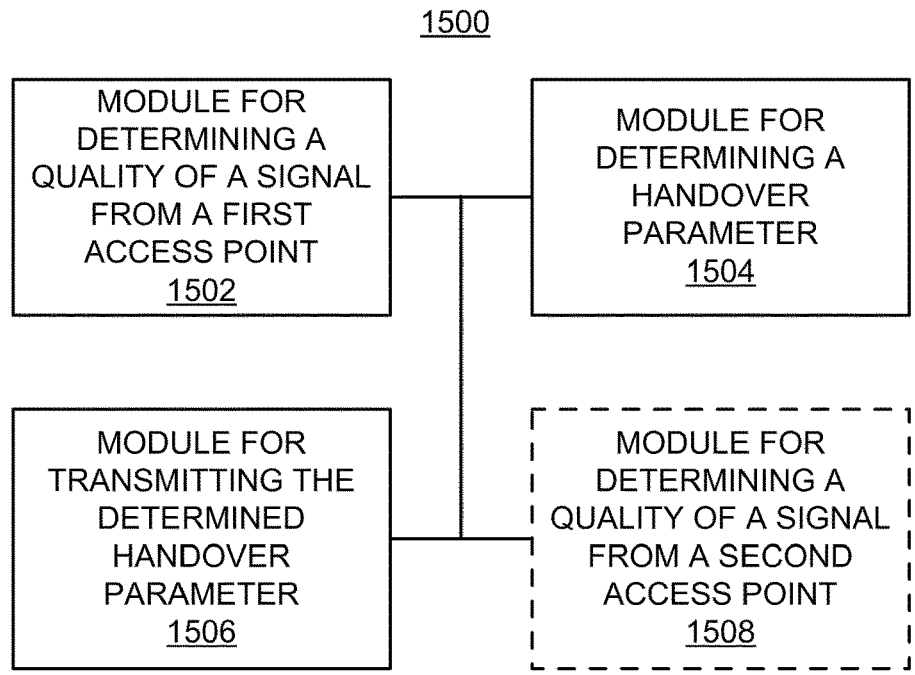
Figure 16:
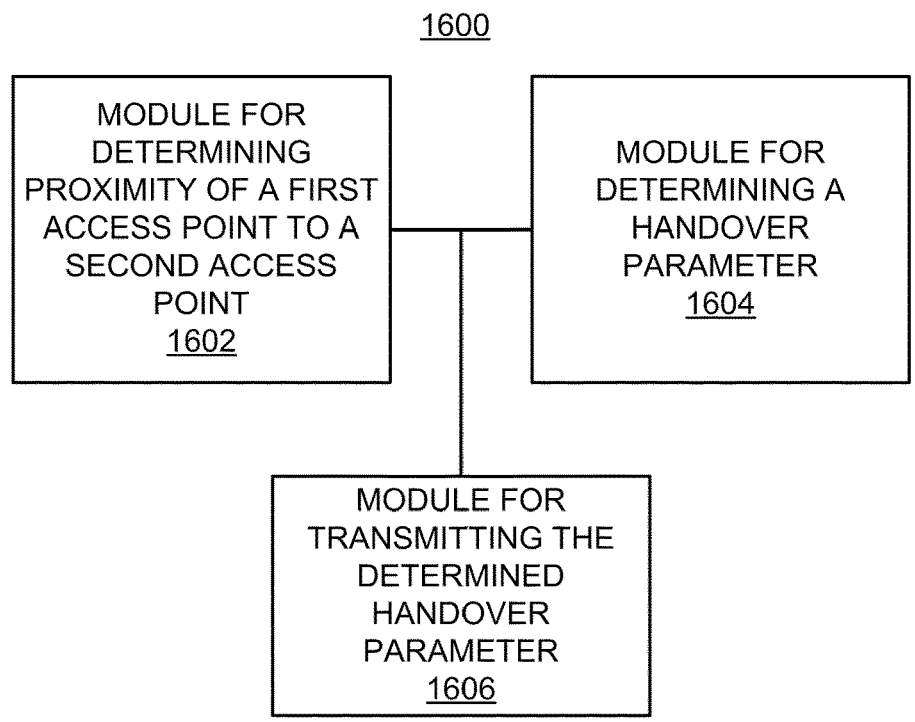

FIG. 12 illustrates a wireless device 1210 (e.g., an access point) and a wireless device 1250 (e.g., an access terminal) of a sample MIMO system 1200. At the device 1210, traffic data for a number of data streams is provided from a data source 1212 to a transmit (TX) data processor 1214. Each data stream may then be transmitted over a respective transmit antenna.

The TX data processor 1214 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1230. A data memory 1232 may store program code, data, and other information used by the processor 1230 or other components of the device 1210.

The modulation symbols for all data streams are then provided to a TX MIMO processor 1220, which may further process the modulation symbols (e.g., for OFDM). The TX MIMO processor 1220 then provides $N_T$ modulation symbol streams to $N_T$ transceivers (XCVR) 1222A through 1222T. In some aspects, the TX MIMO processor 1220 applies beam-forming weights to the symbols of the data streams and to the antenna from which the symbol is being transmitted.

Each transceiver 1222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1222A through 1222T are then transmitted from $N_T$ antennas 1224A through 1224T, respectively.

At the device 1250, the transmitted modulated signals are received by $N_R$ antennas 1252A through 1252R and the received signal from each antenna 1252 is provided to a respective transceiver (XCVR) 1254A through 1254R. Each transceiver 1254 conditions (e.g., filters, amplifies, and downconverts) a respective received signal, digitizes the conditioned signal to provide samples, and further processes the samples to provide a corresponding "received" symbol stream.

A receive (RX) data processor 1260 then receives and processes the $N_R$ received symbol streams from $N_R$ transceivers 1254 based on a particular receiver processing technique to provide $N_T$ "detected" symbol streams. The RX data processor 1260 then demodulates, deinterleaves, and decodes each detected symbol stream to recover the traffic data for the data stream. The processing by the RX data processor 1260 is complementary to that performed by the TX MIMO processor 1220 and the TX data processor 1214 at the device 1210.

A processor 1270 periodically determines which pre-coding matrix to use (discussed below). The processor 1270 formulates a reverse link message comprising a matrix index portion and a rank value portion. A data memory 1272 may store program code, data, and other information used by the processor 1270 or other components of the device 1250.

The reverse link message may comprise various types of information regarding the communication link and/or the received data stream. The reverse link message is then processed by a TX data processor 1238, which also receives traffic data for a number of data streams from a data source 1236, modulated by a modulator 1280, conditioned by the transceivers 1254A through 1254R, and transmitted back to the device 1210.

At the device 1210, the modulated signals from the device 1250 are received by the antennas 1224, conditioned by the transceivers 1222, demodulated by a demodulator (DEMOD) 1240, and processed by a RX data processor 1242 to extract the reverse link message transmitted by the device 1250. The processor 1230 then determines which pre-coding matrix to use for determining the beam-forming weights then processes the extracted message.

FIG. 12 also illustrates that the communication components may include one or more components that perform parameter (PARAM.) control operations as taught herein. For example, a parameter control component 1290 may cooperate with the processor 1230 and/or other components of the device 1210 to send/receive parameter-related information to/from another device (e.g., device 1250) as taught herein. Similarly, a parameter control component 1292 may cooperate with the processor 1270 and/or other components of the device 1250 to send/receive parameter-related information to/from another device (e.g., device 1210). It should be appreciated that for each device 1210 and 1250 the functionality of two or more of the described components may be provided by a single component. For example, a single processing component may provide the functionality of the parameter control component 1290 and the processor 1230 and a single processing component may provide the functionality of the parameter control component 1292 and the processor 1270.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1×RTT, 1×EV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims. Referring to FIGS. 13-16, apparatuses 1300, 1400, 1500, and 1600 are represented as a series of interrelated functional modules. Here, a module for determining a quality of a signal from a first access point 1302 may correspond at least in some aspects to, for example, a parameter controller as discussed herein. A module for determining a cell reselection parameter 1304 may correspond at least in some aspects to, for example, a parameter controller as discussed herein. A module for transmitting the determined cell reselection parameter 1306 may correspond at least in some aspects to, for example, a transmitter as discussed herein. A module for determining a quality of a signal from a second access point 1308 may correspond at least in some aspects to, for example, a parameter controller as discussed herein. A module for determining proximity of a first access point to a second access point 1402 may correspond at least in some aspects to, for example, a parameter controller as discussed herein. A module for determining a cell reselection parameter 1404 may correspond at least in some aspects to, for example, a parameter controller as discussed herein. A module for transmitting the determined cell reselection parameter 1406 may correspond at least in some aspects to, for example, a transmitter as discussed herein. A module for determining a quality of a signal from a first access point 1502 may correspond at least in some aspects to, for example, a parameter controller as discussed herein. A module for determining a handover parameter 1504 may correspond at least in some aspects to, for example, a parameter controller as discussed herein. A module for transmitting the determined handover parameter 1506 may correspond at least in some aspects to, for example, a transmitter as discussed herein. A module for determining a quality of a signal from a second access point 1508 may correspond at least in some aspects to, for example, a parameter controller as discussed herein. A module for determining proximity of a first access point to a second access point 1602 may correspond at least in some aspects to, for example, a parameter controller as discussed herein. A module for determining a handover parameter 1604 may correspond at least in some aspects to, for example, a parameter controller as discussed herein. A module for transmitting the determined handover parameter 1606 may correspond at least in some aspects to, for example, a transmitter as discussed herein.

The functionality of the modules of FIGS. 13-16 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 13-16 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   determining, at a second access point, a signal quality of a first access point;
   determining, at the second access point, a proximity of the second access point relative to the first access point;
   determining, at the second access point and based on the determined signal quality of the first access point and the determined proximity of the second access point relative to the first access point, a handover parameter for controlling handover of an access terminal from the second access point, wherein the determining of the handover parameter comprises:
      setting the handover parameter to a first value when the determined signal quality and the determined proximity are indicative of the second access point being closer to the first access point than to a cell edge of the first access point, and
      setting the handover parameter to a second value different from the first value when the determined signal quality and the determined proximity are indicative of the second access point being closer to the cell edge of the first access point than to the first access point; and
   transmitting, by the second access point, the determined handover parameter to the access terminal.

2. The method of claim 1, wherein the first value is defined to provide a reduced likelihood of the access terminal served by the second access point being prematurely handed-over to the first access point; and
   the second value is defined to provide a reduced likelihood the access terminal served by the second access point experiencing an outage due to the access terminal remaining on the second access point instead of being handed-over to the first access point.

3. The method of claim 1, wherein, if the determined signal quality and the determined proximity are indicative of the second access point being closer to the first access point, the determination of the handover parameter comprises:
   selecting a value of a set of allowable handover parameter values that makes it less likely that the access terminal served by the second access point will be handed-over to the first access point; and
   setting the handover parameter to the first value comprising the selected value.

4. The method of claim 1, wherein, if the determined signal quality and the determined proximity are indicative of the second access point being closer to the cell edge of the first access point, the determination of the handover parameter comprises:
   selecting a value of a set of allowable handover parameter values that makes it more likely that the access terminal served by the second access point will be handed-over to the first access point; and
   setting the handover parameter to the second value comprising the selected value.

5. The method of claim 1, wherein determining the signal quality of the first access point further comprises determining through use of a network listen mode at the second access point.

6. The method of claim 1, wherein the handover parameter comprises a hysteresis parameter.

7. The method of claim 6, wherein the determination of the handover parameter comprises calculating the hysteresis parameter as a function of the determined signal quality.

8. The method of claim 6, wherein the determination of the handover parameter comprises:
   comparing the determined signal quality to a threshold value; and
   setting the hysteresis parameter to a value specified for a cell site if the determined signal quality is greater than or equal to the threshold value.

9. The method of claim 6, wherein the determination of the handover parameter comprises:
   comparing the determined signal quality to a threshold value; and
   setting the hysteresis parameter to a value specified for a cell edge if the determined signal quality is less than or equal to the threshold value.

10. The method of claim 1, wherein the handover parameter comprises a cell individual offset parameter or a time to trigger parameter.

11. The method of claim 1, wherein the determination of the signal quality further comprises determining $E_{cp}/I_0$ of the signal at the second access point.

12. The method of claim 1, wherein the determination of the signal quality further comprises determining received signal code power of the signal at the second access point.

13. The method of claim 1, wherein the determination of the signal quality further comprises estimating path loss from the first access point to the second access point.

14. The method of claim 1, wherein the determination of the signal quality further comprises:
   receiving the signal from the first access point; and
   determining a signal quality parameter based on the received signal.

15. The method of claim 1, wherein the determination of the signal quality further comprises receiving an indication of the signal quality from the access terminal.

16. The method of claim 1, wherein:
   the first access point comprises a macro base station; and
   the second access point comprises a femto cell.

17. The method of claim 1, wherein determining the signal quality from the first access point at the second access point further comprises:
   sending a request from the second access point to one or more access terminals; and
   receiving one or more measurement reports at the second access point from the one or more access terminals, wherein the one or more measurement reports comprise signal quality information.

18. The method of claim 17, wherein determining the signal quality from the first access point at the second access point further comprises performing network listening at the second access point receiving instantaneous power values and determining the signal quality based on the instantaneous power values.

19. The method of claim 1, wherein the determining the signal quality from the first access point at the second access point comprises receiving signal quality information at the second access point via a backhaul, wherein the signal quality information received at the second access point via the backhaul comprises signal quality information measured by the access terminal camped on or served by the first access point and in close proximity to the second access point.

20. An apparatus including a second access point for communication, comprising:

a controller operable to determine a signal quality of a first access point at the second access point, and wherein the controller is further operable to, determine a proximity of the second access point relative to the first access point, determine, at the second access point and based on the determined signal quality of the first access point and the determined proximity of the second access point relative to the first access point, a handover parameter for controlling handover of an access terminal form the second access point, wherein the determination of the handover parameter comprises:

setting the handover parameter to a first value when the determined signal quality and the determined proximity are indicative of the second access point being closer to the first access point than to a cell edge of the first access point, and setting the handover parameter to a second value different from the first value when the determined signal quality and the determined proximity are indicative of the second access point being closer to the cell edge of the first access point than to the first access point; and a transmitter operable to transmit the determined handover parameter from the apparatus to the access terminal.

21. The apparatus of claim 20, wherein:

the first value is defined to provide a reduced likelihood of the access terminal served by the second access point being prematurely handed-over to the first access point; and the second value is defined to provide a reduced likelihood of the access terminal served by the second access point experiencing an outage due to the access terminal remaining on the second access point instead of being handed-over to the first access point.

22. The apparatus of claim 20, wherein:

the controller is further operable to determine the signal quality from the second access point through use of a network listen mode.

23. The apparatus of claim 20, wherein the handover parameter comprises a hysteresis parameter.

24. The apparatus of claim 20, wherein the handover parameter comprises a cell individual offset parameter or a time to trigger parameter.

25. The apparatus of claim 20, wherein the determining the signal quality from the first access point at the second access point comprises receiving signal quality information at the second access point via a backhaul, wherein the signal quality information received at the second access point via the backhaul comprises signal quality information measured by the access terminal camped on or served by the first access point and in close proximity to the second access point.

26. An apparatus for communication, comprising:

means for determining, at a second access point, a signal quality of a signal of a first access point;

means for determining, at the second access point, a proximity of the second access point relative to the first access point;

means for determining, at the second access point and based on the determined signal quality of the first access point and the determined proximity of the second access point relative to the first access point, a handover parameter for controlling handover of an access terminal from the second access point, wherein the means for determining the handover parameter comprises:

means for setting the handover parameter to a first value when the determined signal quality and the determined proximity are indicative of the second access point being closer to the first access point than to a cell edge of the first access point, and means for setting the handover parameter to a second value different from the first value when the determined signal quality and the determined proximity are indicative of the second access point being closer to the cell edge of the first access point than to the first access point; and means for transmitting, by the second access point, the determined handover parameter to the access terminal.

27. The apparatus of claim 26, wherein:

the first value is defined to provide a reduced likelihood of the access terminal served by the second access point being prematurely handed-over to the first access point; and the second value is defined to provide a reduced likelihood of the access terminal served by the second access point experiencing an outage due to the access terminal remaining on the second access point instead of being handed-over to the first access point.

28. The apparatus of claim 26, wherein the means for determining the signal quality at the second access point further comprises means for operating in a network listen mode.

29. The apparatus of claim 26, wherein the handover parameter comprises a hysteresis parameter.

30. The apparatus of claim 26, wherein the handover parameter comprises a cell individual offset parameter or a time to trigger parameter.

31. The apparatus of claim 26, wherein the means for determining the signal quality of the signal from the first access point at the second access point comprises means for receiving signal quality information at the second access point via a backhaul, wherein the signal quality information received at the second access point via the backhaul comprises signal quality information measured by the access terminal camped on or served by the first access point and in close proximity to the second access point.

32. A non-transitory computer-readable medium comprising code for causing a computer to:

determine, at a second access point, a signal quality of a first access point;

determine, at the second access point, a proximity of the second access point relative to the first access point;

determine, at the second access point and based on the determined signal quality of the first access point and the determined proximity of the second access point relative to the first access point, a handover parameter for controlling handover of an access terminal from the second access point, wherein the determination of the handover parameter comprises:

setting the handover parameter to a first value when the determined signal quality and the determined proximity are indicative of the second access point being closer to the first access point than to a cell edge of the first access point, and setting the handover parameter to a second value different from the first value when the determined signal quality and the determined proximity are indicative of the second access point being closer to the cell edge of the first access point than to the first access point; and transmit, by the second access point, the determined handover parameter to the access terminal.

33. The non-transitory computer-readable medium of claim 32, wherein:
the first value is defined to provide a reduced likelihood of the access terminal served by the second access point being prematurely handed-over to the first access point; and
the second value is defined to provide a reduced likelihood of the access terminal served by the second access point experiencing an outage due to the access terminal remaining on the second access point instead of being handed-over to the first access point.

34. The non-transitory computer-readable medium of claim 32, further comprising code for causing the computer to determine the signal quality through use of a network listen mode of the second access point.

35. The non-transitory computer-readable medium of claim 32, wherein the handover parameter comprises a hysteresis parameter.

36. The non-transitory computer-readable medium of claim 32, wherein the handover parameter comprises a cell individual offset parameter or a time to trigger parameter.

37. The non-transitory computer-readable medium of claim 32, wherein the determining the signal quality from the first access point at the second access point comprises receiving signal quality information at the second access point via a backhaul, wherein the signal quality information received at the second access point via the backhaul comprises signal quality information measured by the access terminal camped on or served by the first access point and in close proximity to the second access point.

* * * * *